US012070178B2

(12) United States Patent
Ashbaugh et al.

(10) Patent No.: US 12,070,178 B2
(45) **Date of Patent: *Aug. 27, 2024**

(54) SURFACE CLEANING APPARATUS WITH DRYING CYCLE

(71) Applicant: BISSELL Inc., Grand Rapids, MI (US)

(72) Inventors: Kurt Ashbaugh, Rockford, MI (US); Jason W. Pruiett, Grand Rapids, MI (US); David M. Miller, Zeeland, MI (US); Todd R. VanTongeren, Ada, MI (US)

(73) Assignee: BISSELL Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,953

(22) Filed: Jul. 10, 2023

(65) Prior Publication Data

US 2023/0346176 A1 Nov. 2, 2023

Related U.S. Application Data

(63) Continuation of application No. 17/211,965, filed on Mar. 25, 2021, now Pat. No. 11,737,622, which is a continuation of application No. 16/797,003, filed on Feb. 21, 2020, now Pat. No. 11,019,966.

(60) Provisional application No. 62/810,525, filed on Feb. 26, 2019.

(51) Int. Cl.

| | |
|---|---|
| ***A47L 7/00*** | (2006.01) |
| ***A47L 11/30*** | (2006.01) |
| ***A47L 11/34*** | (2006.01) |
| ***A47L 11/40*** | (2006.01) |
| ***F26B 21/00*** | (2006.01) |

(52) U.S. Cl.

CPC .......... *A47L 7/0085* (2013.01); *A47L 7/0014* (2013.01); *A47L 11/302* (2013.01); *A47L 11/34* (2013.01); *A47L 11/4088* (2013.01); *F26B 21/001* (2013.01)

(58) Field of Classification Search

CPC ............ A47L 5/14; A47L 9/08; A47L 9/2842

See application file for complete search history.

(56) References Cited

U.S. PATENT DOCUMENTS

| | | | |
|---|---|---|---|
| 7,228,589 | B2 | 6/2007 | Miner et al. |
| 8,752,237 | B2 | 6/2014 | DeJonge |
| 10,092,155 | B2 | 10/2018 | Xia et al. |

(Continued)

FOREIGN PATENT DOCUMENTS

| | | |
|---|---|---|
| AU | 2014202658 | 6/2014 |
| CN | 2128519 | 3/1993 |

(Continued)

*Primary Examiner* — Andrew A Horton

(74) *Attorney, Agent, or Firm* — Warner Norcross + Judd LLP

(57) ABSTRACT

The present disclosure provides a surface cleaning apparatus that includes a recovery system that extracts liquid and debris with a drying cycle in which forced air flows through a recovery pathway of the recovery system to dry out components that remain wet and/or retain moisture after normal operation of the apparatus. The post-operation drying cycle can dry out components such as an agitator or brushroll, a brush chamber, a suction nozzle, a recovery tank, a filter, and any of the various conduits, ducts, and/or hoses fluidly coupling components of the recovery system together.

20 Claims, 14 Drawing Sheets

(56) References Cited

U.S. PATENT DOCUMENTS

| | | | | |
|---|---|---|---|---|
| 2007/0016328 | A1 * | 1/2007 | Ziegler | A47L 11/4088 318/609 |
| 2018/0110388 | A1 | 4/2018 | Xia et al. | |
| 2018/0116476 | A1 | 5/2018 | Bloemendaal et al. | |
| 2018/0344112 | A1 | 12/2018 | Krebs et al. | |
| 2018/0368646 | A1 | 12/2018 | Buehler et al. | |

FOREIGN PATENT DOCUMENTS

| | | |
|---|---|---|
| CN | 1765313 | 5/2006 |
| CN | 107752926 | 3/2018 |
| CN | 108553035 | 9/2018 |
| CN | 110192806 | 9/2019 |
| DE | 202016104251 | 8/2016 |
| EP | 3409167 | 12/2018 |
| EP | 3284382 | 11/2019 |
| GB | 2377624 | 1/2003 |
| JP | 2009039252 | 2/2009 |
| WO | 2011065647 | 6/2011 |
| WO | 2012107876 | 8/2012 |

* cited by examiner

SURFACE CLEANING APPARATUS WITH DRYING CYCLE

CROSS-REFERENCE TO RELATED APPLICATION(S)

This application is a continuation of U.S. application Ser. No. 17/211,965, filed Mar. 25, 2021, which is a continuation of U.S. application Ser. No. 16/797,003, filed Feb. 21, 2020, which claims the benefit of U.S. Provisional Patent Application No. 62/810,525 filed Feb. 26, 2019, all of which are incorporated herein by reference in their entirety.

BACKGROUND

Several different types of apparatus are known for cleaning a surface, such as a floor. One category of cleaning apparatus includes a fluid recovery system that extracts liquid and debris (which may include dirt, dust, stains, soil, hair, and other debris) from the surface, and often have a fluid delivery system that delivers cleaning fluid to a surface to be cleaned. The fluid recovery system typically includes a recovery tank, a nozzle adjacent the surface to be cleaned and in fluid communication with the recovery tank through a working air conduit, and a source of suction in fluid communication with the working air conduit to draw the cleaning fluid from the surface to be cleaned and through the nozzle and the working air conduit to the recovery tank. The fluid delivery system typically includes one or more fluid supply tanks for storing a supply of cleaning fluid, a fluid distributor for applying the cleaning fluid to the surface to be cleaned, and a fluid supply conduit for delivering the cleaning fluid from the fluid supply tank to the fluid distributor. An agitator can be provided for agitating the cleaning fluid on the surface.

Such cleaning apparatus can be configured as a multi-surface wet vacuum cleaner adapted for cleaning hard floor surfaces such as tile and hardwood and soft floor surfaces such as carpet and upholstery. Other configurations include upright extraction cleaners, i.e. deep cleaners, portable or handheld extraction cleaners, unattended extraction cleaners or spot cleaners, or autonomous extraction cleaners, i.e. wet extraction robots.

With these various cleaning apparatus recovering fluid and debris, components of the recovery system naturally become wet and can retain moisture after normal operation. If not rinsed and dried out prior to storage (often in a dark closet), bacteria can grow on damp components and generate objectionable odors. To prevent this, after operation a user can remove, rinse off, and air-dry these damp components. However, this requires time, effort and space to lay out the various components during the drying process, and is generally considered a hassle by many consumers.

BRIEF SUMMARY

A surface cleaning apparatus and a drying cycle for a surface cleaning apparatus are provided herein. During the drying cycle, forced air flows through a recovery pathway of the apparatus to dry out components that remain wet and/or retain moisture after normal operation of the apparatus. The drying cycle prevents or minimizes objectionable odors from developing inside the apparatus or on various components of the recovery system, greatly reduces drying time, and simplifies the drying process to reduce user effort and improve user experience.

According to one aspect of the disclosure, a method for post-operation maintenance of a surface cleaning apparatus is provided, the surface cleaning apparatus including a fluid recovery system having a recovery pathway, a suction nozzle, a motor/fan assembly in fluid communication with the suction nozzle for generating a working air stream flowing through the recovery pathway, the motor/fan assembly comprising a vacuum motor and a fan operably coupled with the vacuum motor, and a recovery tank, the recovery tank and the suction nozzle at least partially defining the recovery pathway. The method can include initiating a drying cycle, powering the vacuum motor at a reduced power level; and generating, with the fan, a forced air flow through the recovery pathway to dry components of the fluid recovery system, wherein powering the vacuum motor at the reduced power level comprises powering the vacuum motor at lower power level during the drying cycle than during normal operation of the surface cleaning apparatus.

According to one aspect of the disclosure, a method for post-operation maintenance of a surface cleaning apparatus is provided, the surface cleaning apparatus including a fluid recovery system having a recovery pathway, a suction nozzle, a motor/fan assembly in fluid communication with the suction nozzle for generating a working air stream flowing through the recovery pathway, the motor/fan assembly comprising a vacuum motor and a fan operably coupled with the vacuum motor, and a recovery tank, the recovery tank and the suction nozzle at least partially defining the recovery pathway. The method can include initiating a self-cleaning cycle, during the self-cleaning cycle, powering a pump to deliver cleaning fluid to a brushroll, powering a brushroll motor to rotate the brushroll, and powering the vacuum motor at a first power level, initiating a drying cycle, during the drying cycle, powering vacuum motor at a second power level, and during the drying cycle, generating, with the fan, a forced air flow through the recovery pathway to dry components of the fluid recovery system, wherein the second power level is a reduced power level that is less than the first power level.

These and other features and advantages of the present disclosure will become apparent from the following description of particular embodiments, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF EMBODIMENTS OF THE INVENTION

Figure 1:
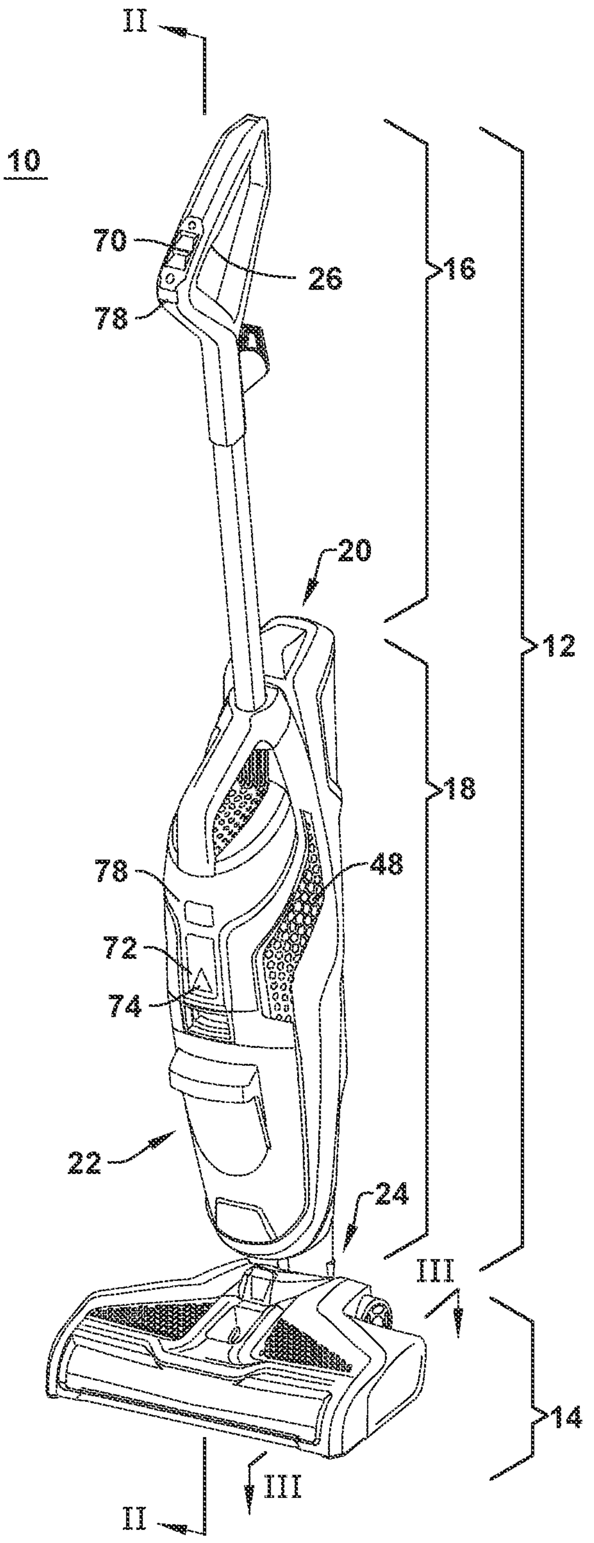
FIG. 1 is a perspective view of a surface cleaning apparatus according to one embodiment of the invention.

The invention generally relates to a surface cleaning apparatus, which may be in the form of a multi-surface wet vacuum cleaner or another apparatus with a recovery system for removing the spent cleaning fluid and debris from the surface to be cleaned and storing the spent cleaning fluid and debris. In particular, aspects of the invention relate to a surface cleaning apparatus with improved post-operation drying of components of the recovery system that remain wet or retain moisture after use.

The functional systems of the surface cleaning apparatus can be arranged into any desired configuration, such as an upright device having a base and an upright body for directing the base across the surface to be cleaned, a canister device having a cleaning implement connected to a wheeled base by a vacuum hose, a portable device adapted to be hand carried by a user for cleaning relatively small areas, an autonomous or robotic device, or a commercial device. Any of the aforementioned cleaners can be adapted to include a flexible vacuum hose, which can form a portion of the working air conduit between a nozzle and the suction source. The surface cleaning apparatus may specifically be in the form of a multi-surface wet vacuum cleaner. As used herein, the term "multi-surface wet vacuum cleaner" includes a vacuum cleaner that can be used to clean hard floor surfaces such as tile and hardwood and soft floor surfaces such as carpet.

The surface cleaning apparatus can include at least a recovery system for removing the spent cleaning fluid (e.g. liquid) and debris from the surface to be cleaned and storing the spent cleaning fluid and debris. The surface cleaning apparatus can optionally further include a fluid delivery system for storing cleaning fluid (e.g. liquid) and delivering the cleaning fluid to the surface to be cleaned. Aspects of the disclosure may also be incorporated into a steam apparatus, such as surface cleaning apparatus with steam delivery. Aspects of the disclosure may also be incorporated into an apparatus with only recovery capabilities, such as surface cleaning apparatus without fluid delivery.

The surface cleaning apparatus can include a controller operably coupled with the various functional systems of the apparatus for controlling its operation and at least one user interface through which a user of the apparatus interacts with the controller. The controller can further be configured to execute a drying cycle in which forced air flows through the recovery system to dry out components that remain wet and/or retain moisture post-operation. The controller can have software for executing the drying cycle.

The drying cycle can include a drying phase in which a fan in fluid communication with the recovery pathway is activated or powered. In some embodiments, the fan can comprise the fan of a suction source that generates a working air stream flowing through the recovery pathway during a normal cleaning operation. In other embodiments, the fan can comprise a fan that is separate from the suction source. In other case, the fan can be driven by a motor, and the motor can be powered during the drying phase to generate, with the fan, the forced air flow through the recovery pathway to dry components of the recovery system.

FIG. 1 is a perspective view of a surface cleaning apparatus 10 according to one aspect of the present disclosure. As discussed in further detail below, the surface cleaning apparatus 10 is provided with a drying cycle in which forced air flows through a recovery pathway of the apparatus 10 post-operation, i.e. after normal operation of the apparatus 10 removing and collecting liquid and debris from the surface to be cleaned, to dry out components of the recovery system which remain wet and/or retain moisture, the details of which are described in further detail below. One example of a suitable surface cleaning apparatus in which the various features and improvements described herein can be used is disclosed in U.S. Pat. No. 10,092,155, issued Oct. 9, 2018, which is incorporated herein by reference in its entirety.

As illustrated herein, the surface cleaning apparatus 10 can be an upright multi-surface wet vacuum cleaner having a housing that includes an upright handle assembly or body 12 and a cleaning head or base 14 mounted to or coupled with the upright body 12 and adapted for movement across a surface to be cleaned. For purposes of description related to the figures, the terms "upper," "lower," "right," "left," "rear," "front," "vertical," "horizontal," "inner," "outer," and derivatives thereof shall relate to the disclosure as oriented in FIG. 1 from the perspective of a user behind the surface cleaning apparatus 10, which defines the rear of the surface cleaning apparatus 10. However, it is to be understood that the disclosure may assume various alternative orientations, except where expressly specified to the contrary.

The upright body 12 can comprise a handle 16 and a frame 18. The frame 18 can comprise a main support section supporting at least a supply tank 20 and a recovery tank 22, and may further support additional components of the body 12. The surface cleaning apparatus 10 can include a fluid delivery or supply pathway, including and at least partially defined by the supply tank 20, for storing cleaning fluid and delivering the cleaning fluid to the surface to be cleaned and a recovery pathway, including and at least partially defined by the recovery tank 22, for removing the spent cleaning fluid and debris from the surface to be cleaned and storing the spent cleaning fluid and debris until emptied by the user.

A moveable joint assembly 24 can be formed at a lower end of the frame 18 and moveably mounts the base 14 to the upright body 12. In the embodiment shown herein, the base 14 can pivot up and down about at least one axis relative to the upright body 12. The joint assembly 24 can alternatively comprise a universal joint, such that the base 14 can pivot about at least two axes relative to the upright body 12. Wiring and/or conduits can optionally supplying air and/or liquid (or other fluids) between the base 14 and the upright body 12, or vice versa, can extend though the joint assembly 24. A locking mechanism (not shown) can be provided to lock the joint assembly 24 against movement about at least one of the axes of the joint assembly 24.

The handle 16 can include a hand grip 26 having a trigger, thumb switch, or other actuator (not shown) which controls fluid delivery from the supply tank 20 via an electronic or mechanical coupling with the tank 20. A carry handle 32 can be disposed on the frame 18, forwardly of the handle 16, at an angle to facilitate manual lifting and carrying of the surface cleaning apparatus 10.

Figure 2:
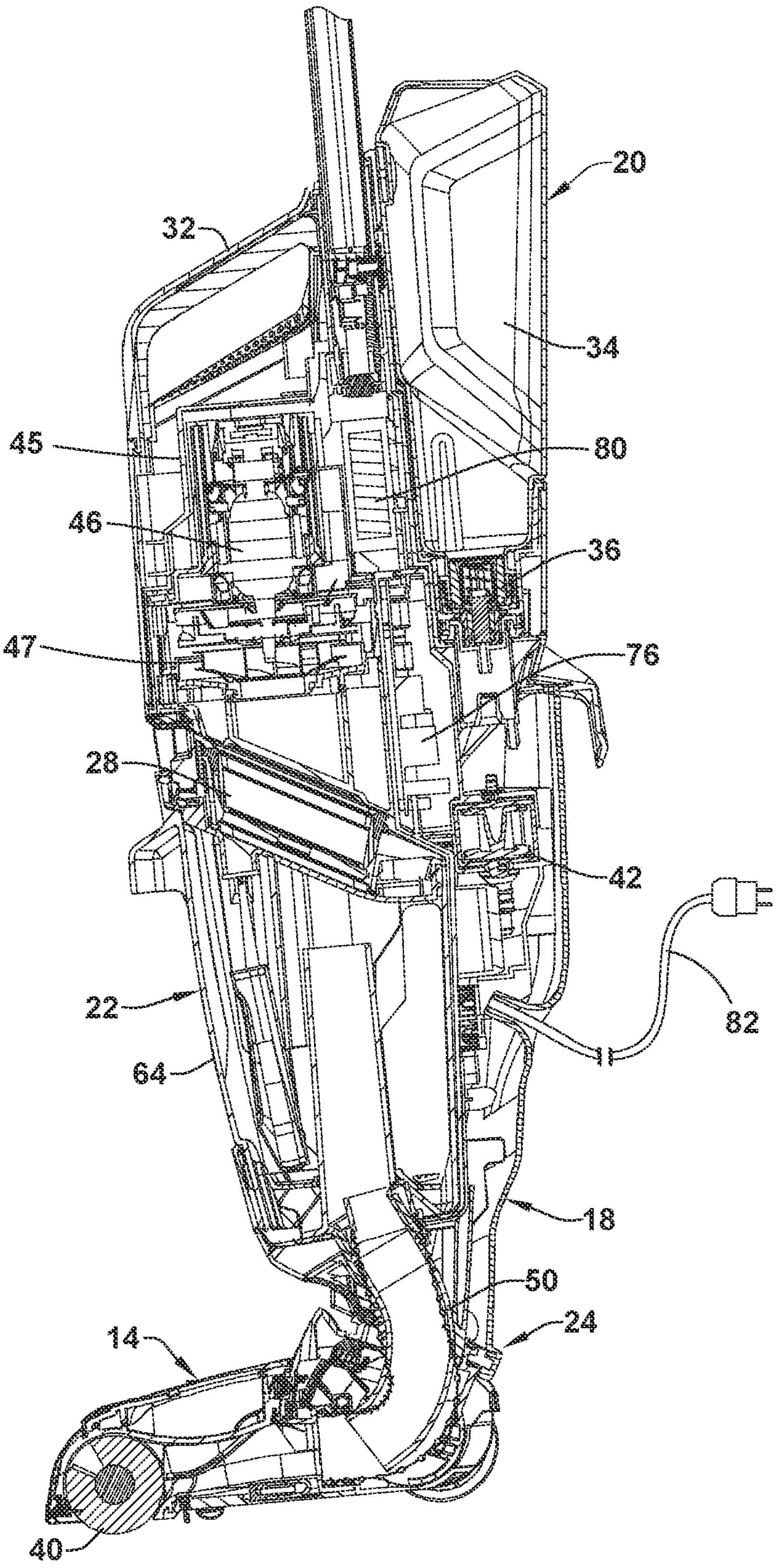
FIG. 2 is a cross-sectional view of the surface cleaning apparatus taken through line II-II of FIG. 1.

FIG. 2 is a cross-sectional view of a portion of the surface cleaning apparatus 10 through line II-II of FIG. 1. The supply and recovery tanks 20, 22 can be provided on the upright body 12. The supply tank 20 can be mounted to the frame 18 in any configuration. In the present example, the supply tank 20 is removably mounted to a housing of the frame 18 such that the supply tank 20 partially rests in the upper rear portion of the frame 18 and can be removed for filling. The recovery tank 22 can be mounted to the frame 18 in any configuration. In the present example, the recovery tank 22 is removably mounted to the front of the frame 18, below the supply tank 20, and can be removed for emptying.

The fluid delivery system is configured to deliver cleaning fluid from the supply tank 20 to a surface to be cleaned, and can include, as briefly discussed above, a fluid delivery or supply pathway. The cleaning fluid can comprise one or more of any suitable cleaning fluids, including, but not limited to, water, compositions, concentrated detergent, diluted detergent, etc., and mixtures thereof. For example, the fluid can comprise a mixture of water and concentrated detergent.

The supply tank 20 includes at least one supply chamber 34 for holding cleaning fluid and a supply valve assembly 36 controlling fluid flow through an outlet of the supply chamber 34. Alternatively, supply tank 20 can include multiple supply chambers, such as one chamber containing water and another chamber containing a cleaning agent. For a removable supply tank 20, the supply valve assembly 36 can mate with a receiving assembly on the frame 18 and can be configured to automatically open when the supply tank 20 is seated on the frame 18 to release fluid to the fluid delivery pathway.

Figure 3:
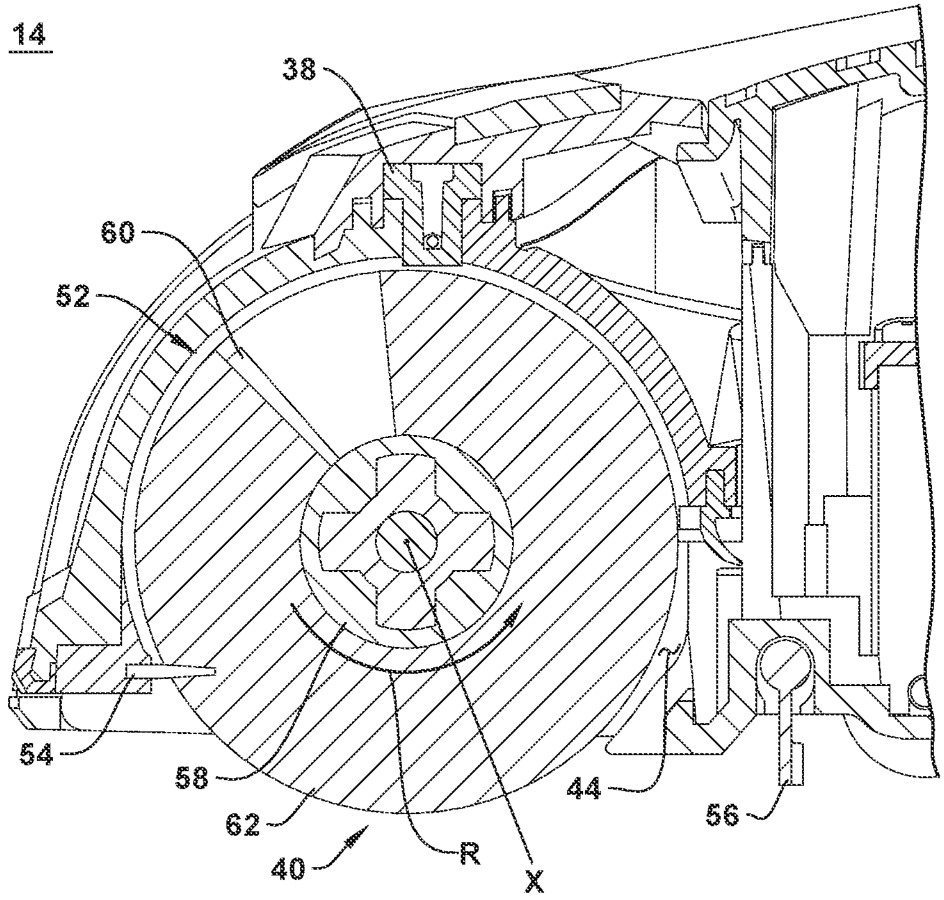
FIG. 3 is an enlarged sectional view through a portion a base of the surface cleaning apparatus taken through line III-III of FIG. 1.

With additional reference to FIG. 3, in addition to the supply tank 20, the fluid delivery pathway can include a fluid distributor 38 having at least one outlet for applying the cleaning fluid to the surface to be cleaned. In one embodiment, the fluid distributor 38 can be one or more spray tips on the base 14 configured to deliver cleaning fluid to the surface to be cleaned directly or indirectly by spraying a brushroll 40. Other embodiments of fluid distributors 38 are possible, such as a spray manifold having multiple outlets or a spray nozzle configured to spray cleaning fluid outwardly from the base 14 in front of the surface cleaning apparatus 10.

The fluid delivery system can further comprise a flow control system for controlling the flow of fluid from the supply tank 20 to the fluid distributor 38. In one configuration, the flow control system can comprise a pump 42 that pressurizes the system. The pump 42 can be positioned within a housing of the frame 18, and in the illustrated embodiment, the pump 42 is beneath and in fluid communication with the supply tank 20 via the valve assembly 36. In one example, the pump 42 can be a centrifugal pump. In another example, the pump 42 can be a solenoid pump having a single, dual, or variable speed.

In another configuration of the fluid supply pathway, the pump 42 can be eliminated and the flow control system can comprise a gravity-feed system having a valve fluidly coupled with an outlet of the supply tank 20, whereby when valve is open, fluid will flow under the force of gravity to the fluid distributor 38.

Optionally, a heater (not shown) can be provided for heating the cleaning fluid prior to delivering the cleaning fluid to the surface to be cleaned. In one example, an in-line heater can be located downstream of the supply tank 20, and upstream or downstream of the pump 42. Other types of heaters can also be used. In yet another example, the cleaning fluid can be heated using exhaust air from a motor-cooling pathway for a suction source of the recovery system.

The recovery system is configured to remove spent cleaning fluid and debris from the surface to be cleaned and store the spent cleaning fluid and debris on the surface cleaning apparatus 10 for later disposal, and can include, as briefly discussed above, a recovery pathway. The recovery pathway can include at least a dirty inlet and a clean air outlet. The pathway can be formed by, among other elements, a suction nozzle 44 defining the dirty inlet, a suction source in fluid communication with the suction nozzle 44 for generating a working air stream, the recovery tank 22, and exhaust vents 48 defining the clean air outlet. In the illustrated example, the recovery tank 22 comprises a collection chamber 64 for the fluid recovery system.

The suction source, which may be a motor/fan assembly 45 including at least a vacuum motor 46 driving a fan 47, is provided in fluid communication with the recovery tank 22. The suction source or vacuum motor 46 can be positioned within a housing of the frame 18, such as above the recovery tank 22 and forwardly of the supply tank 20. The recovery system can also be provided with one or more additional filters upstream or downstream of the vacuum motor 46. For example, in the illustrated embodiment, a pre-motor filter 28 is provided in the working air path downstream of the recovery tank 22 and upstream of the vacuum motor 46.

The suction nozzle 44 can be provided on the base 14 and can be adapted to be adjacent the surface to be cleaned as the base 14 moves across a surface. The brushroll 40 can be provided adjacent to the suction nozzle 44 for agitating the surface to be cleaned so that the debris is more easily ingested into the suction nozzle 44. The suction nozzle 44 is further in fluid communication with the recovery tank 22 through a conduit 50. The conduit 50 can pass through the joint assembly 24 and can be flexible to accommodate the movement of the joint assembly 24. It is noted that the conduit 50 but one example of a conduit for the recovery system, and that the recovery system can include various conduits, ducts, and/or hoses which fluidly couple components of the recovery system together and which define the recovery pathway.

FIG. 3 is an enlarged sectional view through a forward section of the base 14. The brushroll 40 can be provided at a forward portion of the base 14 and received in a brush chamber 52 on the base 14. The brushroll 40 is positioned for rotational movement in a direction R about a central rotational axis X. The base 14 includes the suction nozzle 44 that is in fluid communication with the flexible conduit 50 (FIG. 2) and which is defined within the brush chamber 52. In the present embodiment, the suction nozzle 44 is configured to extract fluid and debris from the brushroll 40 and from the surface to be cleaned.

The brushroll 40 can be operably coupled to and driven by a drive assembly including a brush motor 53 (FIG. 4) located in the base 14. The coupling between the brushroll 40 and the brush motor 53 can comprise one or more belts, gears, shafts, pulleys or combinations thereof. Alternatively, the vacuum motor 46 can provide both vacuum suction and brushroll rotation.

The fluid distributor 38 of the present embodiment includes multiple spray tips, though only one spray tip is visible in FIG. 3, which are mounted to the base 14 with an outlet in the brush chamber 52 and oriented to spray fluid inwardly onto the brushroll 40.

An interference wiper 54 is mounted at a forward portion of the brush chamber 52 and is configured to interface with a leading portion of the brushroll 40, as defined by the direction of rotation R of the brushroll 40. The interference wiper 54 is below the fluid distributor 38, such that the wetted portion of the brushroll 40 rotates past the interference wiper 54, which scrapes excess fluid off the brushroll 40, before reaching the surface to be cleaned.

A squeegee 56 is mounted to the base 14 behind the brushroll 40 and the brush chamber 52 and is configured to contact the surface as the base 14 moves across the surface to be cleaned. The squeegee 56 wipes residual fluid from the surface to be cleaned so that it can be drawn into the fluid recovery pathway via the suction nozzle 44, thereby leaving a moisture and streak-free finish on the surface to be cleaned.

In some embodiments, brushroll 40 can be a hybrid brushroll suitable for use on both hard and soft surfaces, and for wet or dry vacuum cleaning. In one embodiment, the brushroll 40 comprises a dowel 58, a plurality of bristles 60 extending from the dowel 58, and microfiber material 62 provided on the dowel 58 and arranged between the bristles 60. One example of a suitable hybrid brushroll is disclosed in U.S. Pat. No. 10,092,155, incorporated above. The bristles 60 can be arranged in a plurality of tufts or in a unitary strip, and constructed of nylon, or any other suitable synthetic or natural fiber. Dowel 58 can be constructed of a polymeric material such as acrylonitrile butadiene styrene (ABS), polypropylene or styrene, or any other suitable material such as plastic, wood, or metal. The microfiber material 62 can be constructed of polyester, polyamides, or a conjugation of materials including polypropylene or any other suitable material known in the art from which to construct microfiber. In addition, while a horizontally-rotating brushroll 40 is shown herein, in some embodiments, dual horizontally-rotating brushrolls, one or more vertically-rotating brushrolls, or a stationary brush can be provided on the apparatus 10.

Referring to FIG. 1, the surface cleaning apparatus 10 can include at least one user interface through which a user can interact with the surface cleaning apparatus 10. The at least one user interface can enable operation and control of the apparatus 10 from the user's end, and can also provide feedback information from the apparatus 10 to the user. The at least one user interface can be electrically coupled with electrical components, including, but not limited to, circuitry electrically connected to various components of the fluid delivery and recovery systems of the surface cleaning apparatus 10.

In the illustrated embodiment, the surface cleaning apparatus 10 includes a human-machine interface (HMI) 70 having one or more input controls, such as but not limited to buttons, triggers, toggles, keys, switches, or the like, operably connected to systems in the apparatus 10 to affect and control its operation. The surface cleaning apparatus 10 also includes a status user interface (SUI) 72 having at least one status indicator 74 that communicates a condition or status of the apparatus 10 to the user. The at least one status indicator 74 can communicate visually and/or audibly. The HMI 70 and the SUI 72 can be provided as separate interfaces or can be integrated with each other, such as in a composite use interface, graphical user interface, or multimedia user interface. One example of a suitable HMI and/or SUI is disclosed in U.S. Provisional Application No. 62/747,922, filed Oct. 19, 2018, now PCT/US2019/057196, which is incorporated herein by reference in its entirety. Either user interface 70, 72 can comprise a proximity-triggered interface, as described in the '922 application.

The surface cleaning apparatus 10 can further include a controller 76 (FIG. 2) operably coupled with the various functional systems of the apparatus 10 for controlling its operation. The controller 76 can, for example, control the operation of the fluid recovery system, the brushroll 40, and a fan operable during the drying cycle, as described in further detail below. In one embodiment, the controller 76 can comprise a microcontroller unit (MCU) that contains at least one central processing unit (CPU).

The controller 76 is operably coupled with the HMI 70 for receiving inputs from a user and with the SUI 72 for providing one or more indicia about the status of the apparatus 10 to the user via the at least one status indicator 74, and can further be operably coupled with at least one sensor 78 for receiving input about the environment and can use the sensor input to control the operation of the surface cleaning apparatus 10. The controller 76 can use the sensor input to provide one or more indicia about the status of the apparatus 10 to the user via the SUI 72.

In one example, the controller 76 can be located in the upright body 12, such as in the frame 18 as shown in FIG. 2. In the embodiment shown, the controller 76 is in operable communication with but separate from the HMI 70 and the SUI 72. In other embodiments, the controller 76 can be integrated with the HMI 70 or the SUI 72.

With reference to FIG. 1, in the embodiment shown, the HMI 70 and the SUI 72 are physically separate from each other. The HMI 70 in particular is on the hand grip 26, while the SUI 72 is on the frame 18. In other embodiments, the SUI 72, particularly the status indicators 74, can be directly adjacent the HMI 70 or can be integrated with the HMI 70, such as in a composite user interface, graphical user interface, or multimedia user interface. In either alternative, the HMI 70 may be provided elsewhere on the apparatus 10, such as on the frame 18.

Figure 4:
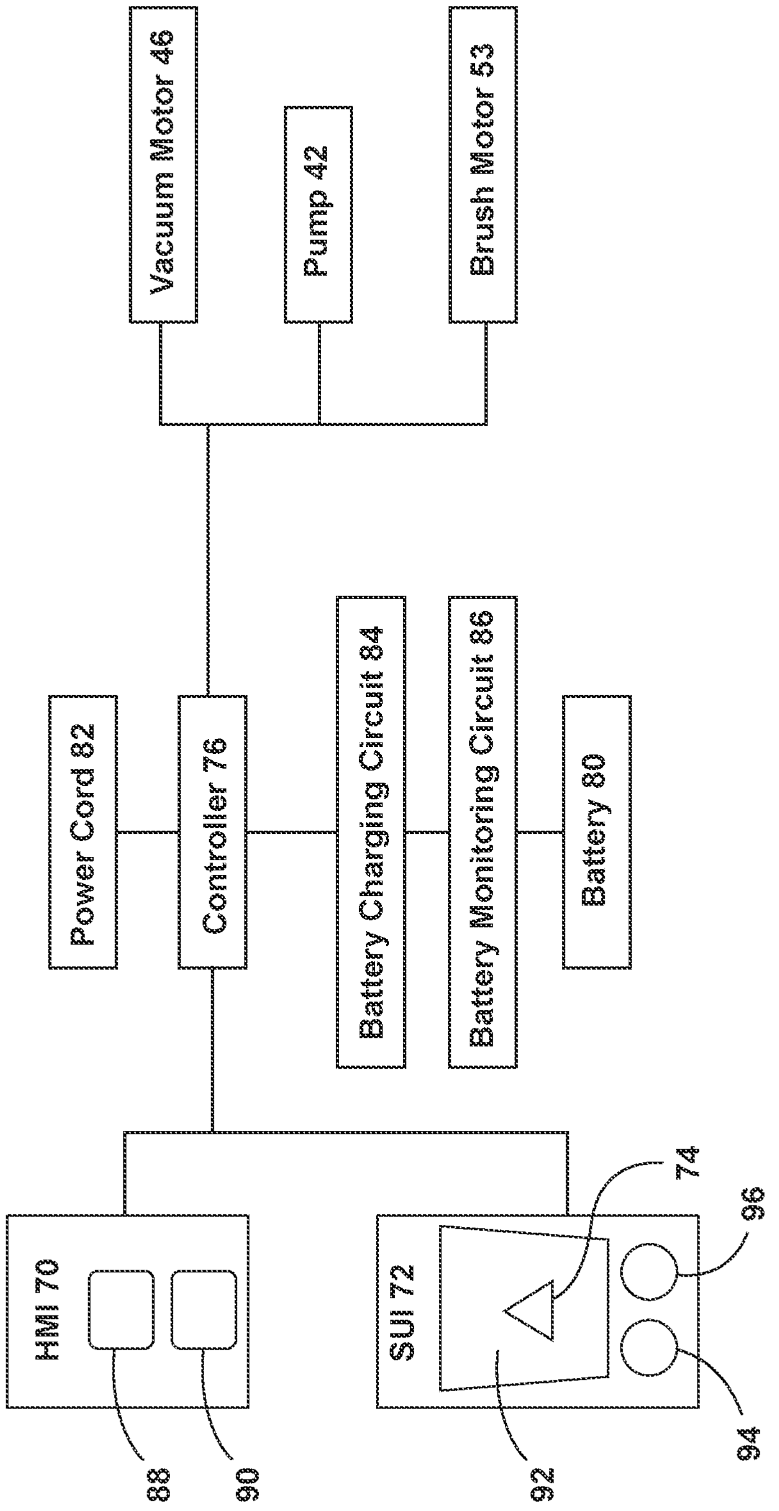
FIG. 4 is a schematic control diagram for the surface cleaning apparatus of FIG. 1.

FIG. 4 is a schematic control diagram for the surface cleaning apparatus 10. As briefly mentioned, above, the controller 76 is operably coupled with the various function systems of the apparatus 10 for controlling its operation. In the embodiment shown, the controller 76 is operably coupled with at least the vacuum motor 46, the pump 42, and the brush motor 53 for the brushroll 40.

Electrical components of the surface cleaning apparatus 10, including the vacuum motor 46, the pump 42, and the brush motor 53, can be electrically coupled to a power source, such as a battery 80 for cordless operation or a power cord 82 plugged into a household outlet for corded operation. In one exemplary arrangement, the battery 80 may comprise a user replaceable battery. In another exemplary arrangement, the battery 80 may comprise a rechargeable battery, such as a lithium ion battery. It is noted that while both a battery 80 and a power cord 82 are shown in FIGS. 2 and 4, it is understood that some embodiments of the apparatus may comprise only the battery 80 and some embodiments of the apparatus may comprise only the power cord 82.

For a cordless surface cleaning apparatus 10 comprising battery 80, the apparatus 10 includes a battery charging circuit 84 that controls recharging of the battery 80. The apparatus 10 can also include a battery monitoring circuit 86 for monitoring the status of the battery 80 and individual battery cells contained therein. Feedback from the battery monitoring circuit 86 is used by the controller 76 to optimize the discharging and recharging process, as well as for displaying battery charge status on the SUI 72.

The HMI 70 can include one or more input controls 88, 90 in register with a printed circuit board (PCB, not shown) within the hand grip 26. In one embodiment, one input control 88 is a power input control that controls the supply of power to one or more electrical components of the apparatus 10. In the illustrated embodiment, the power input control 88 controls the supply of power to at least the SUI 72, the vacuum motor 46, the pump 42, and the brush motor 53. Another input control 90 is a cleaning mode input control that cycles the apparatus 10 between a hard floor cleaning mode and a carpet cleaning mode. In one example of the hard floor cleaning mode, the vacuum motor 46, pump 42, and brush motor 53 are activated, with the pump 42 operating at a first flow rate. In the carpet cleaning mode, the vacuum motor 46, pump 42, and brush motor 53 are activated, with the pump 42 operating at a second flow rate that is greater than the first flow rate. One or more of the input controls 88, 90 can comprise a button, trigger, toggle, key, switch, or the like, or any combination thereof. In one example, one or more of the input controls 88, 90 can comprise a capacitive button. In other embodiments, the HMI 70 can include one or more individual switches for controlling actuation of the vacuum motor 46, the brushroll 40, and/or the pump 42 individually.

The SUI 72 can include a display 92, such as, but not limited to, an LED matrix display or a touchscreen. In one embodiment, the display 92 can include multiple status indicators 74 which can display various detailed apparatus status information, such as, but not limited to, drying status, self-cleaning status, battery status, Wi-Fi connection status, clean water level, dirty water level, filter status, floor type, or any number of other status information. The status indicators can be a visual display, and may include any of a variety of lights, such as LEDs, textual displays, graphical displays, or any variety of known status indicators.

The SUI 72 can include at least one input control 94, which can be adjacent the display 92 or provided on the display 92. The input control 94 can comprise a drying cycle input control that initiates a drying cycle, as described in further detail below. The SUI 72 can optionally include at least one other input control 96, which can comprise a self-cleaning mode input control which initiates a self-cleaning cycle, one embodiment of which is described in detail below. Briefly, during the self-cleaning cycle, cleaning liquid is sprayed on the brushroll 40 while the brushroll 40 rotates. Liquid is extracted and deposited into the recovery tank, thereby also flushing out a portion of the recovery pathway. The input controls 94, 96 can comprise buttons, triggers, toggles, keys, switches, or the like, or any combination thereof. In one example, the input controls 94, 96 can comprise capacitive buttons.

During normal operation of the apparatus 10 to clean a surface, normal operation optionally including the aforementioned hard floor cleaning mode and/or the carpet cleaning mode, the controller can operate the vacuum motor 46 at a first power level or normal power level.

As discussed above, the surface cleaning apparatus 10 is provided with a drying cycle in which forced air flows through the recovery pathway of the apparatus 10 post-operation, i.e. after normal operation of the apparatus 10 removing and collecting liquid and debris from the surface to be cleaned, to dry out components of the recovery system which remain wet and/or retain moisture, the details of which are described in further detail below. Such components can include the agitator or brushroll 40, the brush chamber 52, the suction nozzle 44, the recovery tank 22, any filters upstream or downstream of the vacuum motor 46, such as the pre-motor filter 28, and any of the various conduits, ducts, and/or hoses fluidly coupling components of the recovery system together, such as the conduit 50. After normal operation in which spent cleaning fluid and debris is removed by the recovery system, the drying cycle runs, and components of the recovery system are dried out. Ensuring that the components of the recovery system that remain wet and/or retain moisture are dried out prevents or minimizes objectionable odors from developing inside the apparatus 10 and on the components themselves. The drying cycle also simplifies the drying process to reduce user effort and improve user experience, as the user can choose to run the automated drying cycle after operation rather than having to remove and air-dry the components. The drying cycle also greatly reduces drying time, meaning that the apparatus 10 is readied for use more quickly and with less downtime in between operations. For example, at least some embodiments of the drying cycle disclosed herein have an overall duration of 90 minutes to completely dry out the brushroll and the pre-motor filter. Conversely, waiting for these components to air dry requires more than 12 hours, whether the components are left in the apparatus 10 or removed from the apparatus 10.

While not shown herein, optionally, the surface cleaning apparatus 10 can include a heat source to heat the forced air flow during the drying cycle. The heat source can be a heater located at a point along the recovery pathway.

Figure 5:
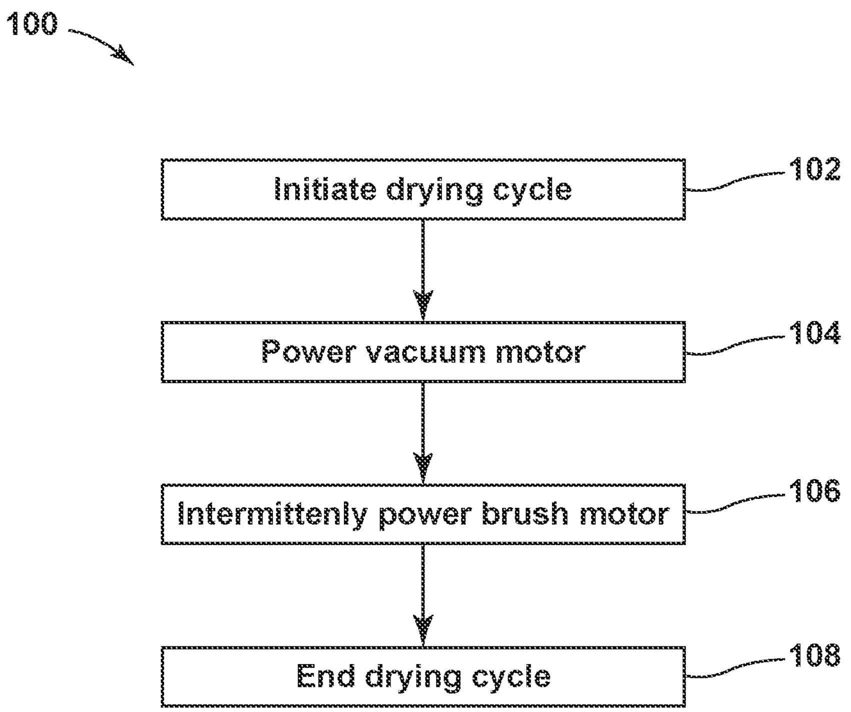
FIG. 5 is a flow chart depicting one embodiment of a method for post-operation maintenance of a surface cleaning apparatus, including post-operation drying.

FIG. 5 is a flow chart depicting one embodiment of a method 100 for post-operation maintenance of the surface cleaning apparatus 10, and more particularly for post-operation drying of the apparatus 10 according to a drying cycle. The sequence of cycle steps discussed is for illustrative purposes only and is not meant to limit the method in any way as it is understood that the steps may proceed in a different logical order, additional or intervening steps may be included, or described steps may be divided into multiple steps.

After normal operation in which spent cleaning fluid and debris is removed by the recovery system of the apparatus 10, the drying cycle can be initiated at step 102. The initiation of the drying cycle can be manual, with the user initiating the drying cycle by selecting the drying cycle input control 94 on the SUI 72, or another user-engageable button or switch provided elsewhere on the apparatus 10. Alternatively, initiation of the drying cycle can be automated so that the drying cycle automatically begins after the end of normal operation. In either case, the drying cycle can be automatically executed by the controller 76 after initiation at step 102, without requiring further user action. For optimal drying performance, prior to initiation of the drying cycle at step 102, the recovery tank 22 can be emptied, rinsed, and replaced on the apparatus 10.

At step 104, the vacuum motor 46 is powered and drives the fan 47, and generates a drying airflow through the recovery pathway of the apparatus 10 to dry out components that are wet and/or retain moisture. In the embodiment of the apparatus 10 shown in FIGS. 1-4, the forced air flows into the suction nozzle 44 defining the dirty inlet, through the brush chamber 52, including past the brushroll 40, through the conduit 50, through the recovery tank 22, through the filter 28, through the vacuum motor 46, and out through the exhaust vents 48 defining the clean air outlet. Forced air can also flow through any of the other various conduits, ducts, and/or hoses that fluidly couple components of the recovery system together and which define the recovery pathway. The vacuum motor 46 can be powered for a predetermined time period during the drying cycle, or can operate until a predetermined moisture level is sensed within the recovery pathway or a component of the recovery system, such as the recovery tank 22 or filter 28. In either case, the vacuum motor 46 can be powered continuously during the drying cycle, or can be cycled on and off intermittently during the drying cycle.

Optionally, during step 104, the controller 76 operates the vacuum motor 46 at a reduced power level for a predetermined time period in order to carry out the drying cycle. The reduced power level can be a second power level less than the first or normal power level. The vacuum motor 46 operates at a reduced speed and thus generates a reduced air flow (compared to the level of air flow during normal operation) through the recovery pathway for drying out at least some of the fluid handling and agitation components of the recovery system. The overall power consumption, volumetric airflow rate, suction level at the suction nozzle 44, and/or sound level of the surface cleaning apparatus 10 can be lower during the drying cycle. In one embodiment, the ratio of motor speed during the drying cycle to motor speed during normal operation can be 30:1. In another example, during normal operation, the overall power consumption of the surface cleaning apparatus 10 is 840 W, and at a ¾" operating orifice the volumetric airflow rate is 18.7 CFM, suction level is 6 IOW and sound level is 80 dBA. Conversely, during the drying cycle, the surface cleaning apparatus 10 draws about 35 W power, and at a ¾" operating orifice the apparatus generates a volumetric airflow rate of 4 CFM, suction level of 0.24 IOW and sound level of 56 dBA.

The drying cycle can optionally include at least one phase in which the brush motor 53 is powered to rotate the brushroll 40. Rotation of the brushroll 40 re-orients the brushroll 40 within the brush chamber 52 and exposes different portions of the brushroll 40 to the forced air flow. In the embodiment shown in FIG. 5, at step 106, the controller 76 can be configured to intermittently power the brush motor 53. By intermittently powering the brush motor 53, the brush motor 53 is turned on and off, i.e. cycled. Cycling the brush motor 53 incrementally rotates the brushroll 40 such that the entire outer surface of the brushroll 40 is eventually exposed to the force air flow during the drying cycle. In one example, the brush motor 53 can be powered to rotate the brushroll 40 for 50 milliseconds every minute. In another example, the brush motor 53 can be powered to rotate the brushroll 40 by increments of at least 15 degrees until the brushroll 40 has been rotated a total of 360 degrees at least one time, or optionally at least two times, or optionally at least three times. In yet another example, during step 106, the brushroll 40 can spin continuously at a low power level and reduced rotational speed.

Alternatively or additionally, during step 106, the brush motor 53 can be powered to rotate the brushroll 40 at high speed for multiple rotations or for a predetermined time period to facilitate more effective shedding of debris, and/or spin-drying.

During step 104, and optional step 106, a heat source or heater can operate to heat the forced air flow. The heater can be run continuously or intermittently.

During step 104, and optional step 106, for a cordless surface cleaning apparatus 10 comprising battery 80, the battery 80 can power the vacuum motor 46 and/or the brush motor 53. Alternatively, power for the drying cycle can be provided via a wall charger, charging tray or docking station, one embodiment of which is described in further detail below. For a corded surface cleaning apparatus 10 comprising power cord 82, the power cord 82 is plugged into a household outlet for execution of the drying cycle and power is drawn from the household outlet.

At step 108, the drying cycle ends by powering the vacuum motor 46 and/or the brush motor 53 off. Optionally, the SUI 72 can alert the user that the drying cycle has ended, such as by providing or updating a drying status indicator on the display 92. The end of the drying cycle at 108 may be time-dependent, or may continue until the one or more components of the recovery system are determined to be dry. For example, one or more moisture sensors can be placed within the recovery pathway in order to determine a moisture level within the recovery pathway or a component of the recovery system, such as the recovery tank 22 or filter 28. In one embodiment, when a predetermined moisture level is reached, for example corresponding to a baseline for when the recovery system is dry enough for adequate performance during a normal operation, the drying cycle can end.

The overall duration of the drying cycle can be dependent upon power consumption, i.e. operating the vacuum motor 46 at a higher power level can reduce dry time but consumes more power. However, as the drying cycle runs unattended in the user's home, the level of noise generated by the drying cycle can be problematic if the vacuum motor 46 is run at the same or a higher power level as during normal operation. Operating the vacuum motor 46 at a reduced power level not only reduces the level of noise generated by the drying cycle, but also reduces the power consumed by the drying cycle, which may be particularly advantageous when powering the drying cycle via a wall charger, charging tray, or docking station, one embodiment of which is described in further detail below. In example, a drying cycle powered by a wall charger with an operating power of 35 W has an overall duration of 90 minutes and at a fairly quiet 56 dB.

Alternatively, powering the drying cycle using battery power for a cordless apparatus 10 or the power cord 82 plugged into a household outlet for a corded apparatus 10 allow for faster dry time.

Figure 6:
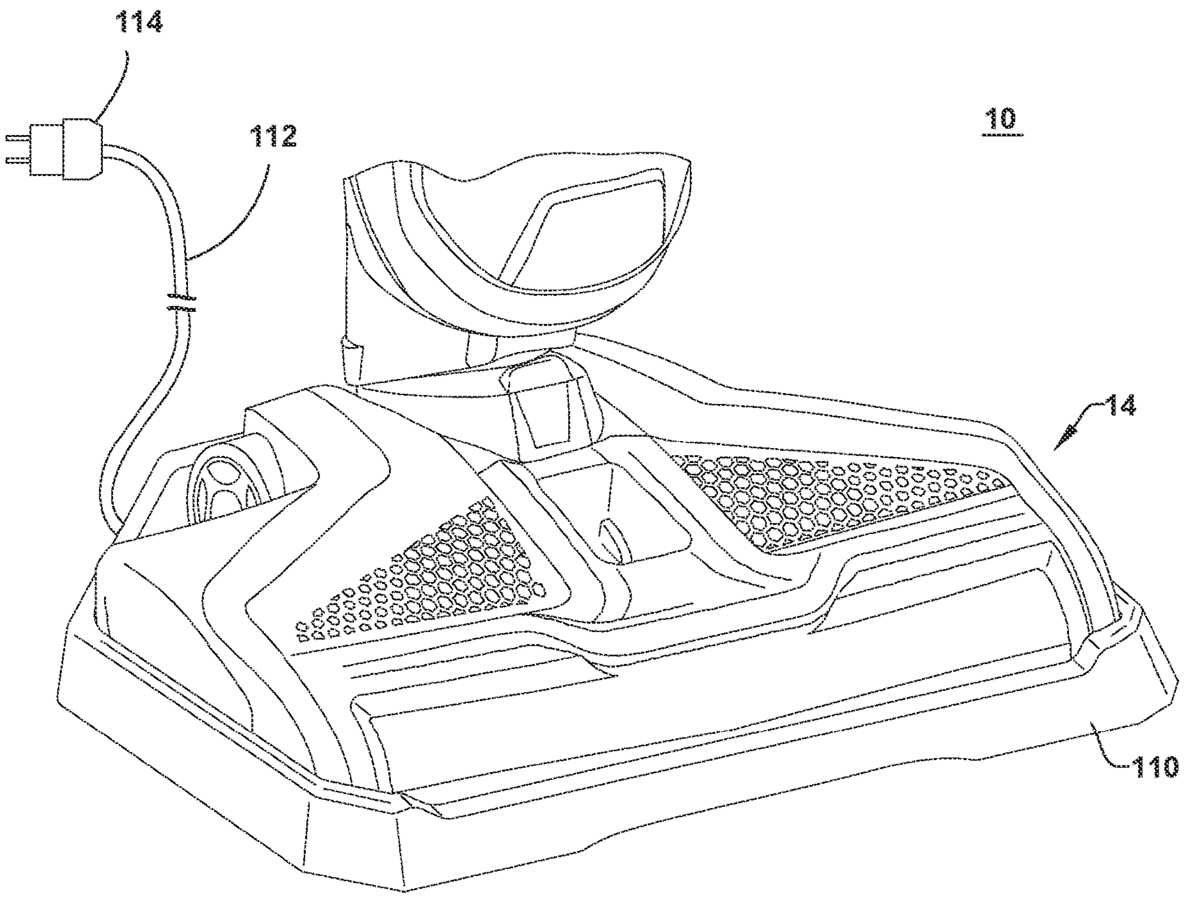
FIG. 6 is a perspective view of the surface cleaning apparatus of FIG. 1 docked in a charging tray or docking station.

Referring to FIG. 6, the surface cleaning apparatus 10 can optionally be provided with a docking station or tray 110 that can be used when storing the apparatus 10. The tray 110 can be configured to receive the base 14 of the apparatus 10 in an upright, stored position. The tray 110 can further be configured for further functionality beyond simple storage, such as for charging the apparatus 10, running the drying cycle, and/or for self-cleaning of the apparatus 10.

For example, in embodiments of the apparatus comprising the rechargeable battery 80, the tray 110 can be configured to recharge the battery 80. The tray 110 includes power cord 112 configured to be plugged into a household outlet, such as by a wall charger 114. The tray 110 can optionally having charging contacts, and corresponding charging contacts can be provided on the exterior of the apparatus 10, such as on the exterior of the base 14. When operation has ceased, the apparatus 10 can be placed into the tray 110 for recharging the battery 80, with the wall charger 114 plugged into a household outlet. One example of a storage tray with charging contacts is disclosed in U.S. Provisional Application No. 62/688,439, filed Jun. 22, 2018, now PCT/US2019/038423 filed Jun. 21, 2019, which is incorporated herein by reference in its entirety.

In the embodiment shown, the surface cleaning apparatus 10 can be docked with the tray 110 for operation of the drying cycle described with reference to FIG. 4. The drying cycle can automatically start upon docking the apparatus 10 on the tray 110. Alternatively, the drying cycle can be initiated manually after docking the apparatus 10 on the tray 110, such as by selecting the drying cycle input control 94 on the SUI 72, or another user-engageable button or switch provided elsewhere on the apparatus 10, or by selecting a user-engageable drying cycle input control, button or switch provided on the tray 110.

In one embodiment, the battery 80 can be recharged while the drying cycle is operating. For example, when the apparatus 10 is docked with the tray 110, the battery charging circuit 84 can be enabled for recharging the battery 80. If the drying cycle is subsequently initiated, the battery charging circuit 84 can remain enabled to continue recharging the battery 80. Thus, power provided via the tray 110, i.e. the power cord 112 plugged into a household outlet by the wall charger 114, is used to simultaneously execute the drying cycle and recharge the battery 80. This can increase the overall duration of the drying cycle and battery recharging time, but reduces the level of noise generated by the drying cycle.

Figure 7:
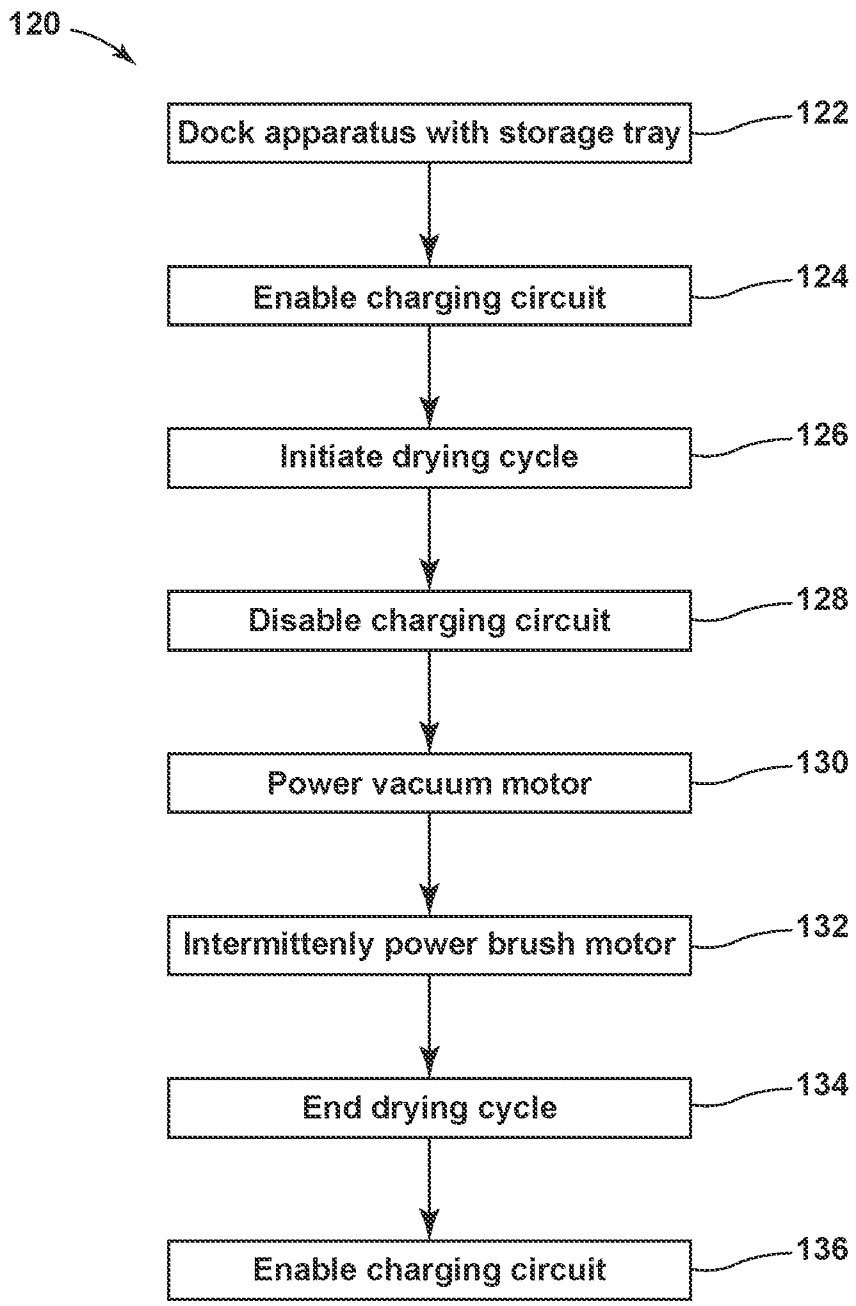
FIG. 7 is a flow chart depicting another embodiment of a method for post-operation maintenance of a surface cleaning apparatus, including post-operation charging and drying.

FIG. 7 is a flow chart depicting another embodiment of a method 120 for post-operation maintenance of the surface cleaning apparatus 10, and more particularly for post-operation charging and drying of the apparatus 10 in which the apparatus 10 is docked for with tray 110 for execution of the method. The sequence of cycle steps discussed is for illustrative purposes only and is not meant to limit the method in any way as it is understood that the steps may proceed in a different logical order, additional or intervening steps may be included, or described steps may be divided into multiple steps. In the method 120 of FIG. 7, the battery charging circuit 84 is disabled during the drying cycle in order to use the full operating power of the wall charger 114 to power the drying cycle.

After normal operation in which spent cleaning fluid and debris is removed by the recovery system, the user docks the apparatus 10 with the tray 110 at step 122. The docking may include parking the base 14 of the apparatus 10 on the tray 110. Before or after step 122, the recovery tank 20 is preferably emptied, rinsed, and replaced on the apparatus 10. When the apparatus 10 is docked with the tray 110, the battery charging circuit 84 is enabled at step 124 for recharging the battery 80.

At step 126, the drying cycle is initiated. The initiation of the drying cycle can be manual, with the user initiating the drying cycle by selecting the drying cycle input control 94 on the SUI 72, or another user-engageable button or switch provided elsewhere on the apparatus 10 or on the tray 110. Alternatively, the drying cycle can automatically initiate upon docking the apparatus 10 on the tray 110, optionally after a predetermined delay period. In either case, the drying cycle can be automatically executed by the controller 76 after initiation at step 124, without requiring further user action. The drying cycle may be locked-out by the controller 76 when the apparatus 10 is not docked with the storage tray 110 to prevent inadvertent initiation of the drying cycle.

The initiation of the drying cycle, however accomplished, disables or shuts off the battery charging circuit 84 at step 128, which halts recharging of the battery 80. At step 130, the vacuum motor 46 energizes and is powered via the tray 110, i.e. the power cord 112 plugged into a household outlet by the wall charger 114. The vacuum motor 46 moves air through the recovery pathway of the apparatus 10 to dry out components that are wet and/or retain moisture, and can operate as described above for step 104 of FIG. 5.

The drying cycle can optionally include step 132 in which the brush motor 53 is powered to rotate the brushroll 40, and can operate as described above for step 106 in FIG. 5. During optional step 132, power for the brush motor 53 can be provided via the tray 110, i.e. the power cord 112 plugged into a household outlet by the wall charger 114.

During step 130, and optional step 132, a heat source or heater can operate to heat the forced air flow. The heater can be run continuously or intermittently.

At step 134, the drying cycle ends by powering the vacuum motor 46 and/or the brush motor 53 off. After the end of the drying cycle, the charging circuit 84 is enabled to continue to recharging the battery 80 at step 136. Optionally, the SUI 72 can alert the user that the drying cycle has ended and/or that battery charging is in progress, such as by providing or updating a drying status indicator and/or a battery status indicator on the display 92. The end of the drying cycle at 134 may be time-dependent, or may continue until the one or more components of the recovery system are determined to be dry based on input from one or more moisture sensors.

The method 120 can be useful for cordless or battery-powered embodiments of the apparatus 10 that are recharged using the docking station or tray 110. In at least some embodiments of the tray 110, the wall charger 114 has a predetermined operating power, for example an operating power of 35 W. However, during a drying cycle during which the vacuum motor 46 and/or brush motor 53 are energized, the required power draw can far exceed the operating power of the wall charger 114. During steps 130-132, the battery charging circuit 84 remains disabled, i.e. the battery 80 does not recharge during the drying cycle, so that the power draw of the apparatus 10 to carry out the drying cycle does not exceed that of the wall charger 114.

With the drying cycle powered by the wall charger 114 of the tray 110, during step 130 the controller 76 operates the vacuum motor 46 at a reduced power level for a predetermined time period in order to carry out the drying cycle. The vacuum motor 46 operates at a reduced speed and thus generates a reduced air flow (compared to the level of air flow during normal operation) through the recovery pathway for drying out at least some of the fluid handling and agitation components of the recovery system. This also lowers the level of noise generated by the drying cycle. In example, the drying cycle powered by the wall charger 114 having an operating power of 35 W has an overall duration of 90 minutes and at a fairly quiet 56 dB.

Figure 8:
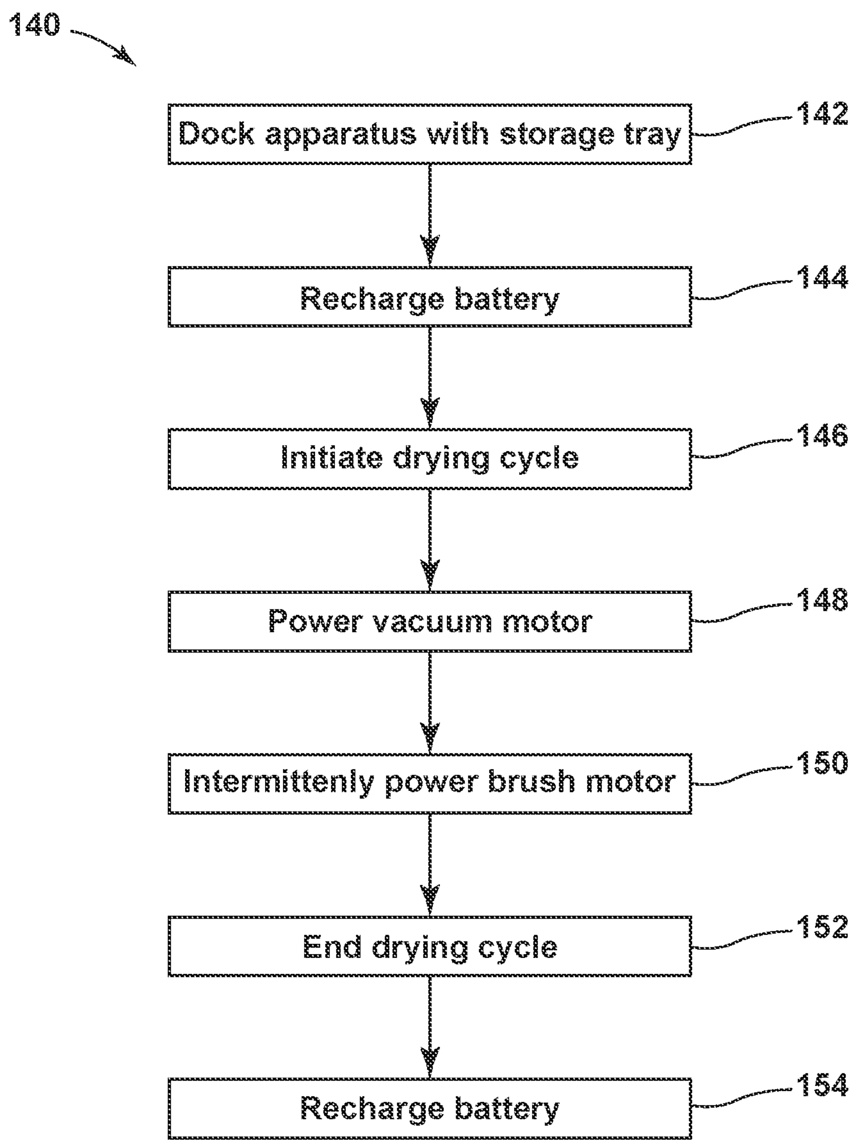
FIG. 8 is a flow chart depicting another embodiment of a method for post-operation maintenance of a surface cleaning apparatus, including post-operation charging and drying.

FIG. 8 is a flow chart depicting another embodiment of a method 140 for post-operation maintenance of the surface cleaning apparatus 10, and more particularly for post-operation charging and drying of the apparatus 10 in which the apparatus 10 is docked for with tray 110 for execution of the method. The sequence of cycle steps discussed is for illustrative purposes only and is not meant to limit the method in any way as it is understood that the steps may proceed in a different logical order, additional or intervening steps may be included, or described steps may be divided into multiple steps. In the method 140 of FIG. 8, the battery 80 is recharged prior to running the drying cycle in order to use the battery 80 to power the drying cycle. The battery 80 can be recharged again after the drying cycle is complete.

After normal operation in which spent cleaning fluid and debris is removed by the recovery system, the user docks the apparatus 10 with the tray 110 at step 142. The docking may include parking the base 14 of the apparatus 10 on the tray 110. Before or after step 142, the recovery tank 22 is preferably emptied, rinsed, and replaced on the apparatus 10.

When the apparatus 10 is docked with the tray 110, the battery charging circuit 84 is enabled at step 144 for recharging the battery 80. The battery charging circuit 84 remains enabled until the battery 80 is fully charged. Alternatively, the battery charging circuit 84 can remain enabled until the battery 80 reaches a charge level sufficient for powering a complete drying cycle. Regardless of the charge level reached, during step 144, the drying cycle can be disabled, such that a user cannot initiate the drying cycle.

After the battery 80 reaches a charge level sufficient for powering at least one complete drying cycle, at step 146, the drying cycle is enabled and can be initiated. The initiation of the drying cycle can be manual, with the user initiating the drying cycle by selecting the drying cycle input control 94 on the SUI 72, or another user-engageable button or switch provided elsewhere on the apparatus 10 or on the tray 110. Alternatively, the drying cycle can automatically initiate upon the battery 80 reaching a charge level sufficient for powering at least one complete drying cycle. In either case, the drying cycle can be automatically executed by the controller 76 after initiation at step 146, without requiring further user action. During the drying cycle, the battery charging circuit 84 can be disabled or shut off. The drying cycle may be locked-out by the controller 76 when the apparatus 10 is not docked with the storage tray 110 to prevent inadvertent initiation of the drying cycle.

At step 148, the vacuum motor 46 energizes and is powered via the tray 110, i.e. the power cord 112 plugged into a household outlet by the wall charger 114. The vacuum motor 46 moves air through the recovery pathway of the apparatus 10 to dry out components that are wet and/or retain moisture, and can operate as described above for step 104 of FIG. 5.

The drying cycle can optionally include step 150 in which the brush motor 53 is powered to rotate the brushroll 40, and can operate as described above for step 106 in FIG. 5. During optional step 150, power for the brush motor 53 can be provided by the battery 80.

During step 148, and optional step 150, a heat source or heater can operate to heat the forced air flow. The heater can be run continuously or intermittently.

At step 152, the drying cycle ends by powering the vacuum motor 46 and/or the brush motor 53 off. Optionally, the SUI 72 can alert the user that the drying cycle has ended, such as by providing or updating a drying status indicator on the display 92. The end of the drying cycle at 152 may be time-dependent, or may continue until the one or more components of the recovery system are determined to be dry based on input from one or more moisture sensors.

After the end of the drying cycle, the charging circuit 84 is enabled to recharge the battery 80 a second time at step 154. Optionally, the SUI 72 can alert the user that battery charging is in progress, such as by providing or updating a battery status indicator on the display 92.

The method 140 can be useful for cordless or battery-powered embodiments of the apparatus 10 that are recharged using the docking station or tray 110. In at least some embodiments of the tray 110, the wall charger 114 has a predetermined operating power, for example an operating power of 35 W. However, during a drying cycle during which the vacuum motor 46 and/or brush motor 53 are energized, the required power draw for recharging the battery 80 and for executing the drying cycle can far exceed the operating power of the wall charger 114, but do not exceed that of the battery 80. By first recharging the battery 80 and then using the battery 80 to power the drying cycle, and subsequently recharging the battery 80 again, the drying cycle can be powered while also making sure apparatus 10 is dry and charged for its next use.

With the drying cycle powered by the battery 80, during step 148, the controller 76 operates the vacuum motor 46 at the same power level and at the same speed as during normal operation, for a predetermined time period in order to carry out the drying cycle. The vacuum motor 46 thus generates the same air flow (compared to the level of air flow during normal operation) through the recovery pathway for drying out at least some of the fluid handling and agitation components of the recovery system. This reduces the overall duration of the drying cycle.

Referring to FIG. 6, in one embodiment of the storage tray 110, the tray 110 can be configured for use during a self-cleaning mode of the apparatus 10, which can be used to clean the brushroll 40 and internal components of the fluid recovery pathway of apparatus 10. The storage tray 110 can optionally be adapted to collect liquid used to clean the interior parts of apparatus 10 and/or receiving liquid that may leak from the supply tank 20 while the apparatus 10 is not in active operation. During use, the apparatus 10 can get very dirty, particularly in the brush chamber 52 and recovery pathway, and can be difficult for the user to clean. In at least some embodiments, the tray 110 can function as a cleaning tray during a self-cleaning cycle, which can optionally operate in conjunction with a drying cycle. Self-cleaning using the tray 110 can save the user considerable time and may lead to more frequent use of the apparatus 10.

Figure 9:
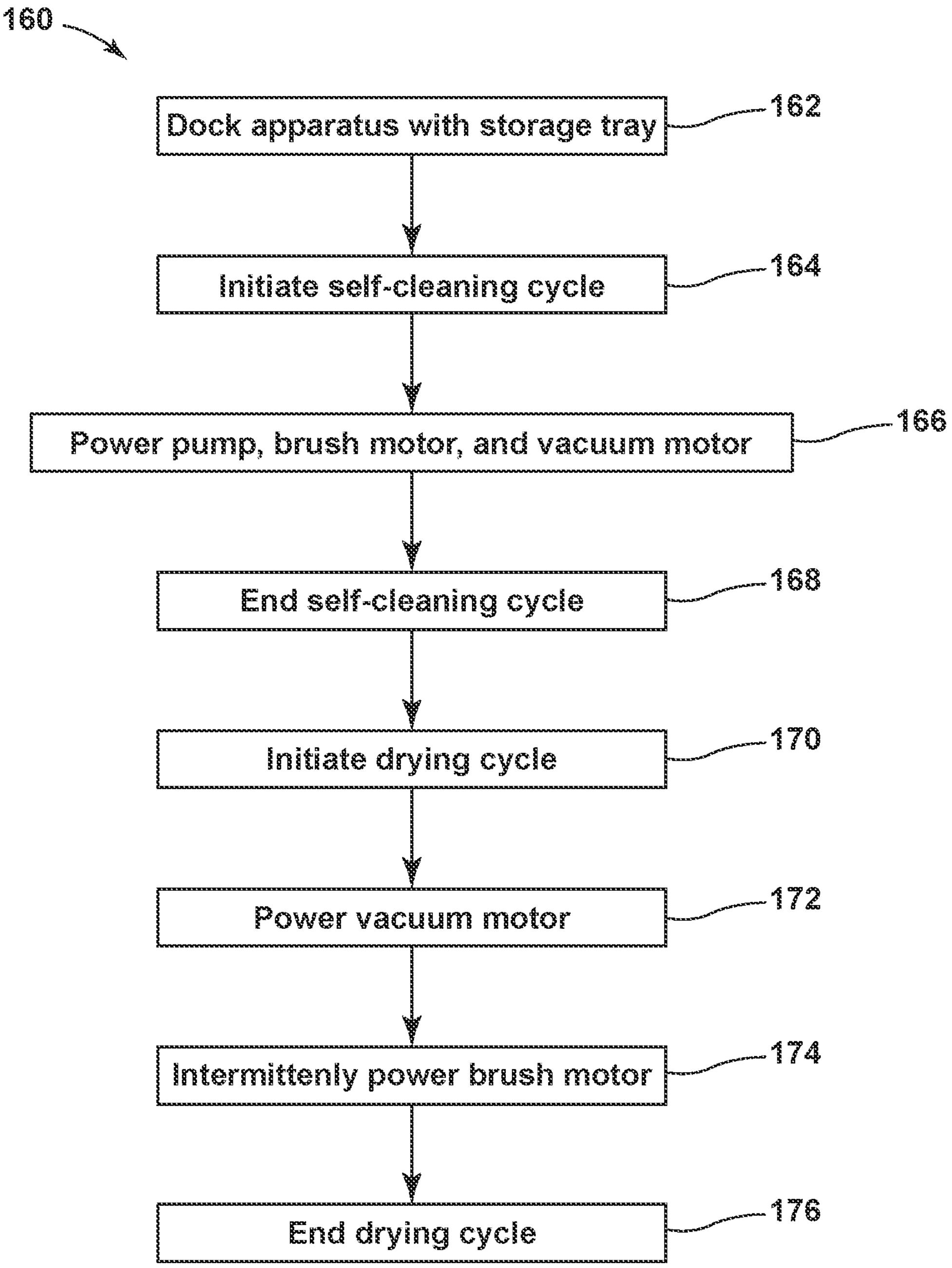
FIG. 9 is a flow chart depicting another embodiment of a method for post-operation maintenance of a surface cleaning apparatus.

FIG. 9 is a flow chart depicting another embodiment of a method 160 for post-operation maintenance of the surface cleaning apparatus 10, in which the apparatus 10 is docked for with tray 110 for execution of the maintenance, which includes a drying cycle. The sequence of cycle steps discussed is for illustrative purposes only and is not meant to limit the method in any way as it is understood that the steps may proceed in a different logical order, additional or intervening steps may be included, or described steps may be divided into multiple steps. In the method 160 of FIG. 9, a self-cleaning cycle and a drying cycle are executed sequentially for cleaning and drying components of the recovery system of the apparatus 10.

After normal operation in which spent cleaning fluid and debris is removed by the recovery system, the user docks the apparatus 10 with the tray 110 at step 162. The docking may include parking the base 14 of the apparatus 10 on the tray 110. Before or after step 132, the recovery tank 22 is preferably emptied, rinsed, and replaced on the apparatus 10.

At step 164, the self-cleaning cycle is initiated. The self-cleaning cycle may be locked-out by the controller 76 when the apparatus 10 is not docked with the storage tray 110 to prevent inadvertent initiation of the self-cleaning cycle.

The initiation of the self-cleaning cycle can be manual, with the user initiating the self-cleaning cycle by selecting the self-cleaning cycle input control 96 on the SUI 72, or another user-engageable button or switch provided elsewhere on the apparatus 10 or on the tray 110. Alternatively, the self-cleaning cycle can automatically initiate upon docking the apparatus 10 on the tray 110, optionally after a predetermined delay period. In either case, the self-cleaning cycle can be automatically executed by the controller 76 after initiation at step 164, without requiring further user action. In yet another embodiment, the self-cleaning cycle can be manual, with the user initiating the cycle by manually energizing the apparatus 10 and depressing the trigger, thumb switch, or other actuator (not shown) on the hand grip 26 to distribute cleaning fluid.

Initiating the self-cleaning cycle at step 164 can power one or more components of the apparatus 10. For example, at step 164, the pump 42 can be powered to deliver cleaning fluid from the supply tank 20 to the distributor 38 that sprays the brushroll 40. During step 164, the brush motor 53 can also be powered to rotate the brushroll 40 at while applying cleaning fluid to the brushroll 40 to flush the brush chamber 52 and cleaning lines, and wash debris from the brushroll 40. The self-cleaning cycle may use the same cleaning fluid normally used by the apparatus 10 for surface cleaning, or may use a different detergent focused on cleaning the recovery system of the apparatus 10.

The vacuum motor 46 can be actuated during or after step 164 to extract the cleaning fluid via the suction nozzle 44. During extraction, the cleaning fluid and debris collected in the tray 110 is sucked through the suction nozzle 44 and the downstream recovery pathway. The flushing action also cleans at least a portion of the recovery pathway of the apparatus 10, including the suction nozzle 44, the brush chamber 52, and downstream conduits, ducts, and/or hoses that fluidly couple components of the recovery system together, such as the conduit 50.

At step 166, the self-cleaning cycle ends. The end of the self-cleaning cycle can be time-dependent, or can continue until the recovery tank 22 is full or the supply tank 20 is empty. For a timed self-cleaning cycle, the pump 42, brush motor 53, and vacuum motor 46 are energized and de-energized for predetermined periods of time. Optionally, the pump 42 or brush motor 53 can pulse on/off intermittently so that any debris is flushed off the brushroll 40 and extracted into the recovery tank 22. Optionally, the brushroll 40 can be rotated at slower or faster speeds to facilitate more effective wetting, shedding of debris, and/or spin-drying. Near the end of the cycle, the pump 42 can de-energize to end fluid dispensing while the brush motor 53 and vacuum motor 46 can remain energized to continue extraction. This is to ensure that any liquid remaining in the tray 110, on the brushroll 40, or in the recovery pathway is completely extracted into the recovery tank 22. Optionally, during step 166, the SUI 72 can alert the user that the self-cleaning cycle has ended, such as by providing or updating a self-cleaning status indicator on the display 92.

The drying cycle can be initiated at step 168. The initiation of the drying cycle can be manual, with the user initiating the drying cycle by selecting the drying cycle input control 94 on the SUI 72, or another user-engageable button or switch provided elsewhere on the apparatus 10 or on the tray 110. Alternatively, the drying cycle can automatically initiate after the end of the self-cleaning cycle, optionally after a predetermined delay period. In either case, the drying cycle can be automatically executed by the controller 76 after initiation at step 168, without requiring further user action. Optionally, prior to initiation of the drying cycle, the recovery tank 22 can be emptied of any liquid or debris collected during the self-cleaning cycle.

At step 170, the vacuum motor 46 energizes and generates a drying airflow through the recovery pathway of the apparatus 10 to dry out components that are wet and/or retain moisture, and can operate as described above for step 104 of FIG. 5. During step 170, the motor controller operates the vacuum motor at a reduced power level, or at the same power level and at the same speed as during normal operation. The drying cycle can optionally include step 172 in which the brush motor 53 is powered to rotate the brushroll 40, and can operate as described above for step 106 in FIG. 5. During step 170, and optional step 172, a heat source or heater can operate to heat the forced air flow. The heater can be run continuously or intermittently.

At step 174, the drying cycle ends by powering the vacuum motor 46 and/or the brush motor 53 off. Optionally, the SUI 72 can alert the user that the drying cycle has ended, such as by providing or updating a drying status indicator on the display 92. The end of the drying cycle at 174 may be time-dependent, or may continue until the one or more components of the recovery system are determined to be dry based on input from one or more moisture sensors.

During method 160, the battery 80 can power the pump 42, vacuum motor 46 and/or the brush motor 53. Alternatively, power for the method 160 can be provided via the tray 110, i.e. the power cord 112 plugged into a household outlet by the wall charger 114. In one embodiment, the battery 80 can be recharged during one or both of the self-cleaning cycle and the drying cycle. In another embodiment, the battery charging circuit 84 is disabled during one or both of the self-cleaning cycle and the drying cycle in order to use the full operating power of the wall charger 114 to power the maintenance cycle(s). In yet another embodiment, the battery 80 is recharged prior to running the self-cleaning cycle in order to use the battery 80 to power both maintenance cycles. The battery 80 can be recharged again after the drying cycle is complete.

Figure 10:
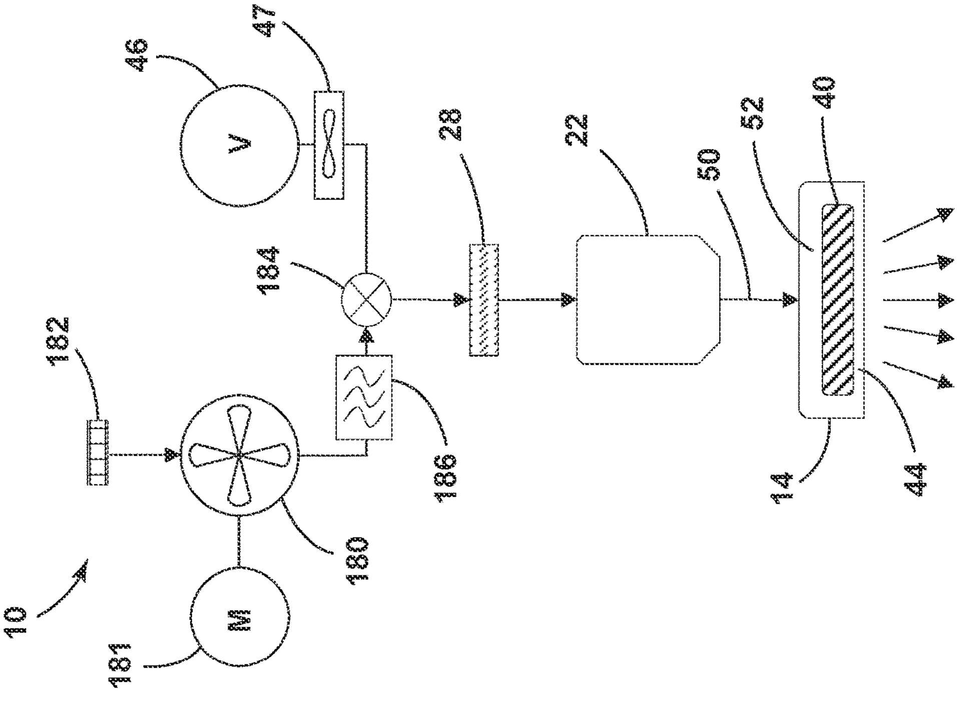
FIG. 10 is a schematic view of a surface cleaning apparatus according to another embodiment of the invention.

FIG. 10 is a schematic view of another embodiment of the surface cleaning apparatus 10. The embodiment of FIG. 10 is substantially similar to the embodiment of the apparatus shown in FIGS. 1-4, and like elements will be referred to with the same reference numerals. Also, while not shown in FIG. 10, the surface cleaning apparatus 10 can optionally be provided with the docking station or tray 110 described above.

In the illustrated embodiment, the apparatus 10 includes an auxiliary blower or drying fan 180 which operates during the drying cycle to produce the flow of forced air through the recovery system to dry out components which remain wet and/or retain moisture post-operation, instead of the suction source 46 producing the forced air flow for the drying cycle.

The drying fan 180 is separate from the suction source, e.g. a second fan 180, in addition to the first fan 47. The drying fan 180 can be driven by a fan motor 181, e.g. a second motor 181 in addition to the first vacuum motor 46.

The drying fan 180 can be located upstream or downstream from the recovery tank 22, and can be configured to move air through the recovery pathway in the same direction of air flow during normal operation, or can be configured to move air through the recovery pathway "backwards" or in the opposite direction of air flow during normal operation. In the embodiment shown in FIG. 10, the drying fan 180 pushes air through the recovery pathway "backwards" or in the opposite direction of air flow during normal operation, as indicated by the arrows, and draws ambient drying air in through an intake 182 in the housing of the apparatus 10 and exhausts the drying air through the suction nozzle 44. The intake 182 can be an opening in the housing of the apparatus 10, such as in the upright body 12 or frame 18, optionally covered by a grill or louvers to prevent large debris from entering the drying fan 180 and recovery pathway. The intake 182 can be fluidly isolated from the clean air outlet of the recovery pathway, e.g. the exhaust vents 48 (FIG. 1).

A diverter 184 can be provided in the recovery pathway to divert fluid communication with the recovery pathway between the suction source or vacuum motor 46 for normal operation and the drying fan 180 for the drying cycle. The diverter 184 can be manually operated by the user, or automatically operated by the controller 76, such as upon selection of the drying cycle input control 94 on the SUI 72, or another user-engageable button or switch provided elsewhere on the apparatus 10 or on the tray 110. In some embodiments, the diverter 184 can comprise an electronically-actuatable diverter valve, such as a rotatable diverter valve.

The diverter 184 can have at least a first position and a second position. In the first position, the suction source or vacuum motor 46 is in fluid communication with the recovery pathway, and more specifically can be in fluid communication with the dirty inlet or suction nozzle 44. The diverter 184 can be in the first position during normal operation of the apparatus 10 to clean a surface. In the second position, the drying fan 180 is in fluid communication with the recovery pathway, and more specifically can be in fluid communication with the dirty inlet or suction nozzle 44. The diverter 184 can be in the second position during the drying cycle.

In some embodiments of the apparatus 10, a heat source can be provided to speed the drying process and shorten the drying cycle. As shown in FIG. 10, the surface cleaning apparatus 10 further includes a heater 186 to heat the air to be blown inside the apparatus 10, i.e. forced through the recovery pathway, by the drying fan 180. The heater 186 can be automatically powered by the controller 76, such as upon selection of the drying cycle input control 94 on the SUI 72, or another user-engageable button or switch provided elsewhere on the apparatus 10 or on the tray 110. Alternatively, the heater 186 can be manually operated by the user.

The heat source or heater 186 can be located anywhere along the recovery pathway, and can be preferably located at the intake 182 or the drying fan 180, or otherwise upstream of one or more of the recovery tank 22, filter 28, brush chamber 52, or suction nozzle 44, to maximize the exposure of the wet or moisture-retaining components to the heated drying air.

Figure 11:
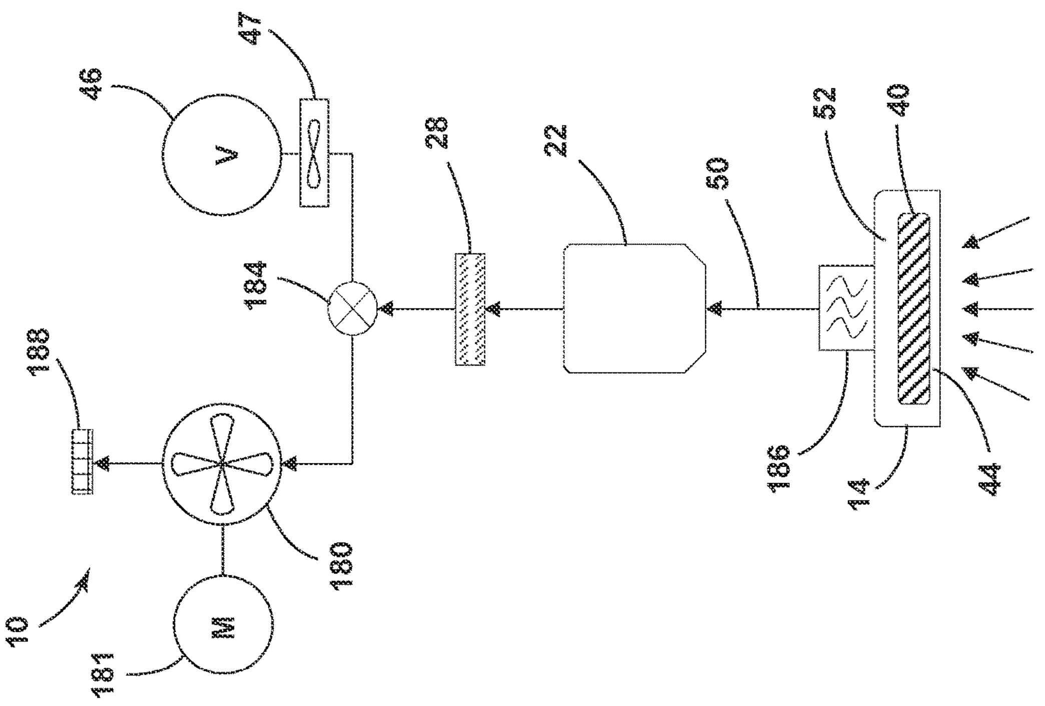
FIG. 11 is a schematic view of a surface cleaning apparatus according to another embodiment of the invention.

FIG. 11 is a schematic view of another embodiment of the surface cleaning apparatus 10. The embodiment of FIG. 11 is substantially similar to the embodiment of the apparatus shown in FIG. 10, with the exception that the drying fan 180 is configured to pull air through the recovery pathway in the same direction of air flow during normal operation, as indicated by the arrows, and draws ambient drying air in through the suction nozzle 44 and exhausts the drying air through an outlet 188 in the housing of the apparatus 10. The outlet 188 can be an opening in the housing of the apparatus 10, such as in the upright body 12 or frame 18, optionally covered by a grill or louvers to prevent large debris from entering the drying fan 180 and recovery pathway. The outlet 188 can be fluidly isolated from the clean air outlet of the recovery pathway, e.g. the exhaust vents 48 (FIG. 1).

Also in the embodiment of FIG. 11, the heat source or heater 186 can be located on or within the base 14 to heat the air drawn in through the suction nozzle 44 to maximize the exposure of the wet or moisture-retaining components to the heated drying air. In one example, the heater 186 is configured to heat the air within the brush chamber 52, and can further heat the brushroll 40 itself in certain embodiments. Alternatively, the heater 186 can be or otherwise upstream of one or more of the recovery tank 22 or filter 28.

Figure 12:
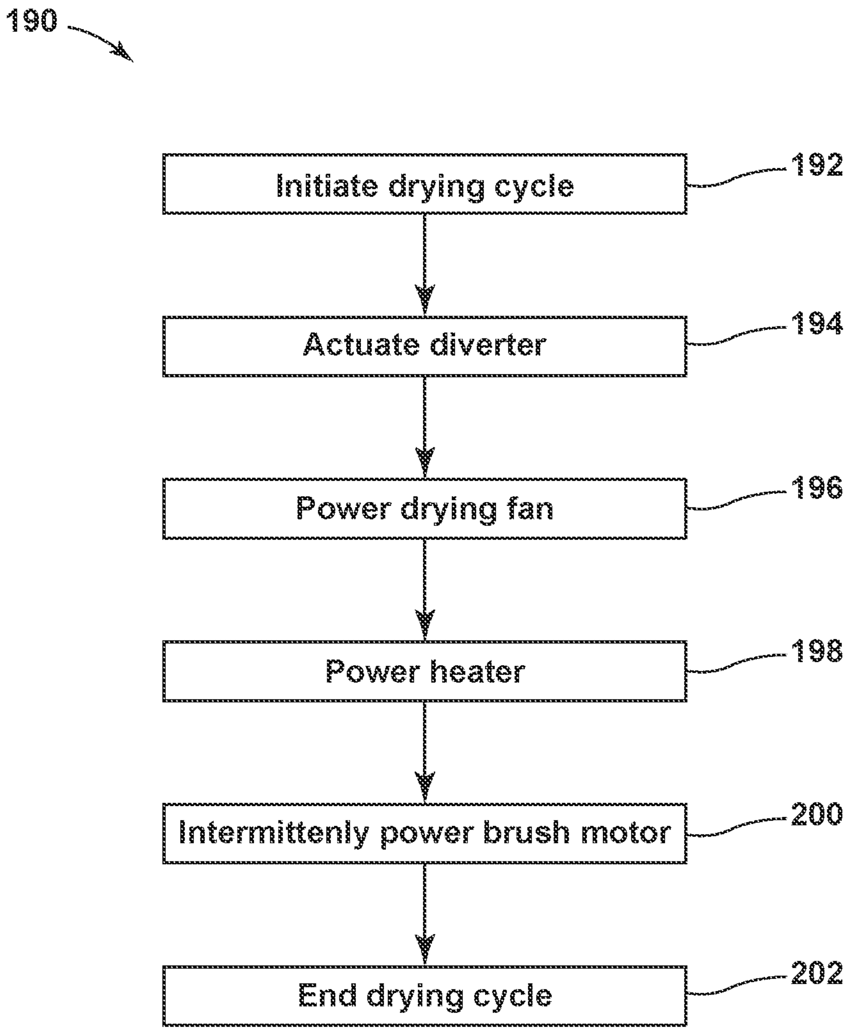
FIG. 12 is a flow chart depicting another embodiment of a method for post-operation maintenance of a surface cleaning apparatus, including post-operation drying.

FIG. 12 is a flow chart depicting an embodiment of a method 190 for post-operation maintenance of the surface cleaning apparatus 10 of FIG. 10 or FIG. 11, and more particularly for post-operation drying of the apparatus 10. The sequence of cycle steps discussed is for illustrative purposes only and is not meant to limit the method in any way as it is understood that the steps may proceed in a different logical order, additional or intervening steps may be included, or described steps may be divided into multiple steps.

After normal operation in which spent cleaning fluid and debris is removed by the recovery system of the apparatus 10, the drying cycle can be initiated at step 192. In some embodiments of the method 190, prior to initiation of the drying cycle can be initiated at step 192, the apparatus 10 can be docked with the tray 110.

The initiation of the drying cycle can be manual, with the user initiating the drying cycle by selecting the drying cycle input control 94 on the SUI 72, or another user-engageable button or switch provided elsewhere on the apparatus 10 or on the tray 110. Alternatively, initiation of the drying cycle can be automated so that the drying cycle automatically begins after the end of normal operation. In either case, the drying cycle can be automatically executed by the controller 76 after initiation at step 192, without requiring further user action. For optimal drying performance, prior to initiation of the drying cycle at step 192, the recovery tank 22 can be emptied, rinsed, and replaced on the apparatus 10.

Next, at step 194 the diverter 184 is moved to place the recovery pathway in fluid communication with the drying fan 180, and closes off fluid communication with the suction source or vacuum motor 46. The diverter 184 can be automatically operated by the controller 76 upon initiation of the drying cycle. Alternatively, the diverter 184 can be manually operated by the user at step 194.

At step 196, the drying fan 180 is powered, and generates a drying airflow through the recovery pathway of the apparatus 10 to dry out components that are wet and/or retain moisture. In the embodiment of the apparatus 10 shown in FIG. 10, the forced air flows into the intake 182, optionally past the heater 186 to be heated, through the filter 28, through the recovery tank 22, through the conduit 50, through the brush chamber 52, including past the brushroll 40, and out through the suction nozzle 44. In the embodiment of the apparatus 10 shown in FIG. 11, the forced air flows into the suction nozzle 44 and through the brush chamber 52, including past the brushroll 40, optionally past the heater 186 to be heated, through the recovery tank 22, through the filter 28, and out through the outlet 188. In either embodiment, forced air can also flow through any of the other various conduits, ducts, and/or hoses that fluidly couple components of the recovery system together and which define the recovery pathway. The drying fan 180 can be powered for a predetermined time period during the drying cycle, or can operate until a predetermined moisture level is sensed within the recovery pathway or a component of the recovery system, such as the recovery tank 22 or filter 28. In either case, the drying fan 180 can be powered continuously during the drying cycle, or can be cycled on and off intermittently during the drying cycle.

Optionally, the drying fan 180 operates at a reduced speed, and thus generates a reduced air flow, compared to that of the vacuum motor 46 during normal operation. This lowers the level of noise generated by the drying cycle.

The drying cycle can optionally include step 198 in which the heater 186 is powered to heat the air to be blown inside the apparatus 10, i.e. forced through the recovery pathway, by the drying fan 180. The heater 186 can be powered at the same time as the drying fan 180; alternatively, the heater 186 can power on prior to or after the drying fan 180. The heater 186 can be powered for a predetermined time period during the drying cycle, or can operate until a predetermined moisture level is sensed within the recovery pathway or a component of the recovery system, such as the recovery tank 22 or filter 28. In either case, the heater 186 can be powered continuously during the drying cycle, or can be cycled on and off intermittently during the drying cycle.

The drying cycle can optionally include step 200 in which the brush motor 53 is powered to rotate the brushroll 40, and can operate as described above for step 106 in FIG. 5.

During step 196, and optional steps 198 and 200, for a cordless surface cleaning apparatus 10 comprising battery 80, the battery 80 can power the drying fan 180, the heater 186, and/or the brush motor 53. Alternatively, power for the drying cycle can be provided via the tray 110, i.e. the power cord 112 plugged into a household outlet by the wall charger 114. For a corded surface cleaning apparatus 10 comprising power cord 82, the power cord 82 is plugged into a household outlet for execution of the drying cycle and power is drawn from the household outlet.

At step 202, the drying cycle ends by powering the drying fan 180, the heater 186, and/or the brush motor 53 off. Optionally, the SUI 72 can alert the user that the drying cycle has ended, such as by providing or updating a drying status indicator on the display 92. The end of the drying cycle at 202 may be time-dependent, or may continue until the one or more components of the recovery system are determined to be dry based on input from one or more moisture sensors.

The end of the drying cycle at step 202 can also include moving the diverter 184 to place the recovery pathway in fluid communication with the suction source or vacuum motor 46, and closing off fluid communication with the drying fan 180. This readies the apparatus 10 for subsequent use in the normal operating mode.

Figure 13:
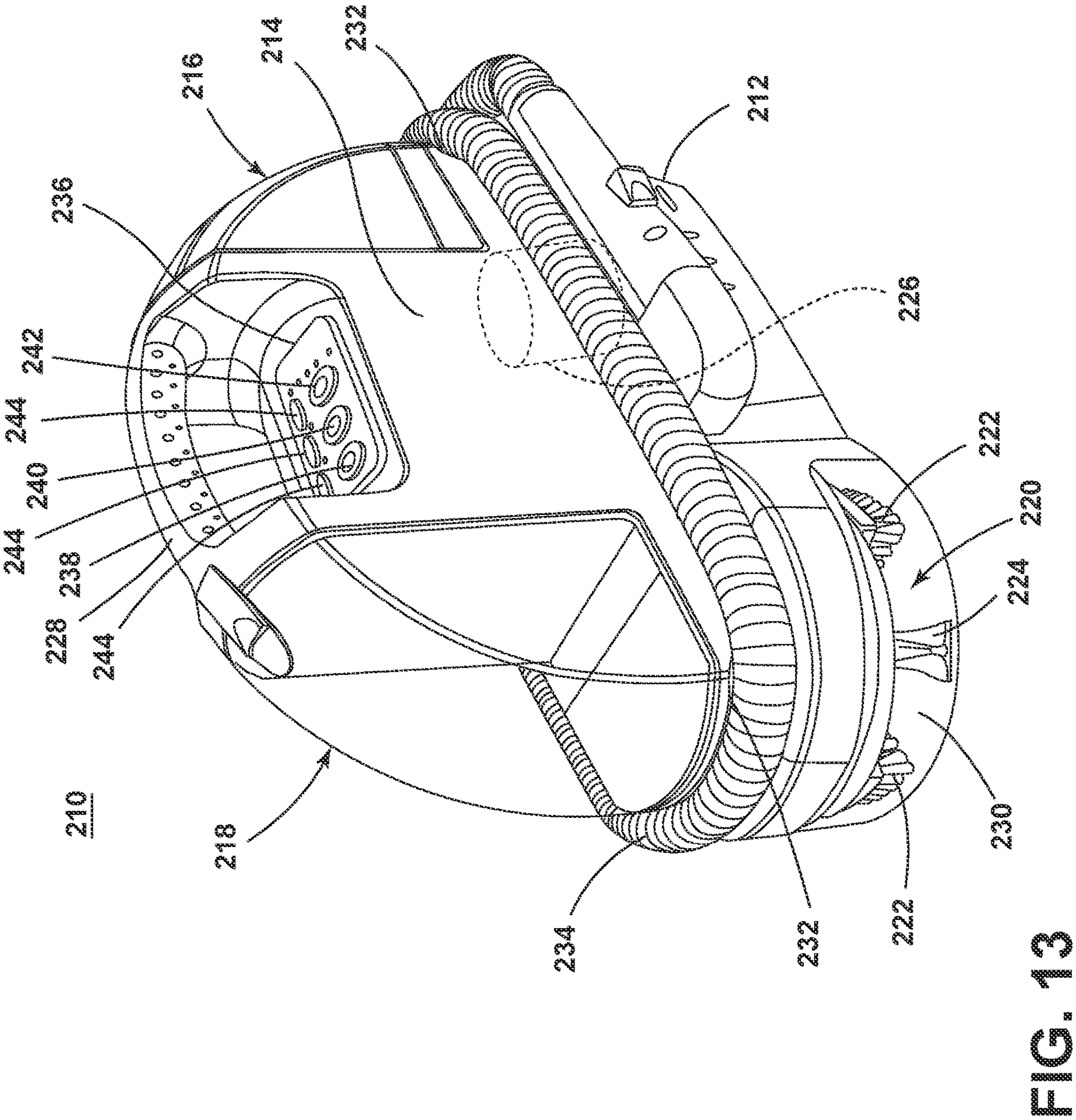
FIG. 13 is a perspective view of a surface cleaning apparatus in the form of a portable extraction cleaner or spot cleaning apparatus according to another embodiment of the invention.
Figure 14:
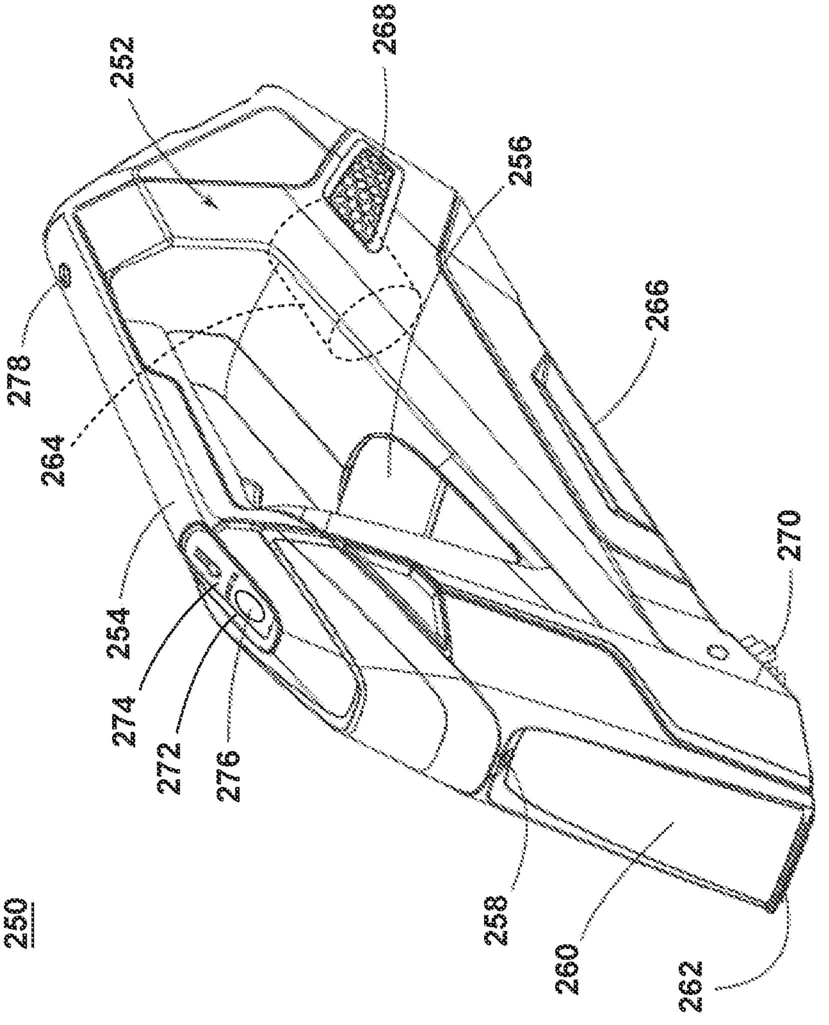
FIG. 14 is a perspective view of a surface cleaning apparatus in the form of a handheld extraction cleaning apparatus according to another embodiment of the invention.
Figure 15:
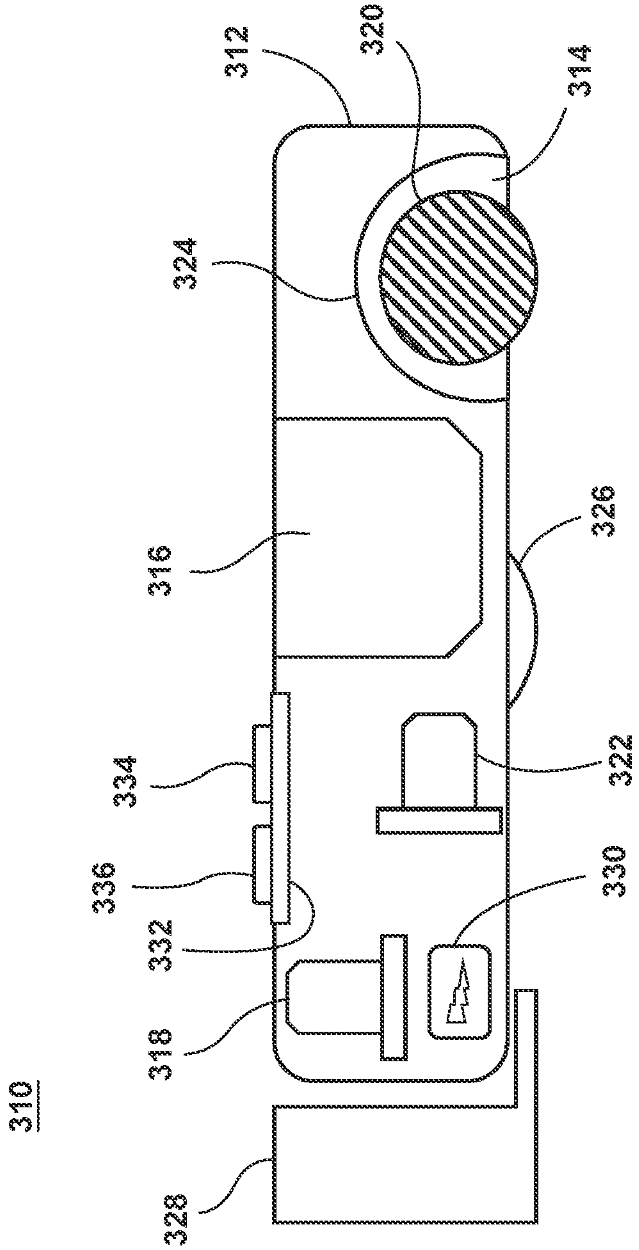
FIG. 15 is a schematic view of a surface cleaning apparatus in the form of autonomous surface cleaning apparatus or wet extraction robot according to another embodiment of the invention.

The various embodiments of the drying cycle disclosed herein can be applied to a variety of other surface cleaning apparatus, some examples of which are shown in FIGS. 13-15, in which components of a recovery system that remain wet and/or retain moisture post-operation.

FIG. 13 is a perspective view of a surface cleaning apparatus according to another embodiment of the invention, comprising a portable extraction cleaner or spot cleaning apparatus 210. The apparatus 210 can be used for unattended or manual cleaning of spots and stains on carpeted surfaces and can include various systems and components described for the embodiment of FIG. 1, including a recovery system for removing liquid and debris from the surface to be cleaned and a fluid delivery system for storing cleaning fluid and delivering the cleaning fluid to the surface to be cleaned. One example of a suitable small-area extraction cleaner or spot cleaning apparatus in which the various features and improvements described herein can be used is disclosed in U.S. Pat. No. 7,228,589 issued Jun. 12, 2007, which is incorporated herein by reference in its entirety.

The apparatus 210 includes a bottom housing or portion 212, a top housing or portion 214, a supply tank 216, a recovery tank 218, a moveable carriage assembly 220 comprising a plurality of agitators 222 and suction nozzles 224, a suction source, which may be a motor/fan assembly including at least a vacuum motor 226 (indicated in phantom line). The bottom housing 212 rests on a surface to be cleaned, and the top housing 214 and the bottom housing 212 mate to form a cavity therebetween. A handle 228 is integrally formed at an upper surface of the top housing 214 to facilitate easy carrying of the apparatus 210.

A carriage assembly lens 230 is attached to a forward lower section of the bottom housing 212 to define an opening in the underside of the bottom housing 212 and is preferably made from a transparent material for visibility of the carriage assembly 220 located behind the carriage assembly lens 230. Hose recesses 232 are integrally formed in a lower surface of the top housing 214 in forward and rearward locations that can hold a flexible hose 234, which can form a portion a recovery pathway in some modes of operation.

The apparatus 210 can include a controller 236 operably coupled with the various functional systems of the apparatus for controlling its operation and at least one user interface through which a user of the apparatus interacts with the controller 236. The user interface shown includes various input controls 238, 240, 242 to control operation of the apparatus 210, and one or more status indicators or lights 244 located adjacent to the input controls 238, 240, 242. The input controls 238, 240, 242 can comprise buttons, triggers, toggles, keys, switches, or the like, or any combination thereof. The controller 236 can be a microcontroller unit (MCU) that contains at least one central processing unit (CPU).

The controller 236 can further be configured to execute a drying cycle in which forced air flows through the recovery system to dry out components that remain wet and/or retain moisture post-operation. Such components can include the recovery tank 218, the carriage assembly 220, including the agitators 222 and the suction nozzles 224, the carriage assembly lens 230, the hose 234, any filters upstream or downstream of the vacuum motor 226, and any of the various conduits, ducts, and/or hoses fluidly coupling components of the recovery system together. The input control 242 can comprise a drying cycle input control that initiates a drying cycle. The drying cycle can proceed according to any of the embodiments described above, and can include powering the vacuum motor 226 to produce the flow of forced air through the recovery system and/or the carriage assembly 220 for movement.

FIG. 14 is a perspective view of a surface cleaning apparatus according to another embodiment of the invention, comprising a handheld extraction cleaning apparatus 250. As illustrated herein, the apparatus 250 is adapted to be handheld and portable, and can be easily carried or conveyed by hand. The apparatus 250 can include various systems and components described for the embodiment of FIG. 1, including a recovery system for removing liquid and debris from the surface to be cleaned and a fluid delivery system for storing cleaning fluid and delivering the cleaning fluid to the surface to be cleaned. One example of a suitable handheld extraction cleaner in which the various features and improvements described herein can be used is disclosed in U.S. Patent Application Publication No. 2018/0116476, published May 3, 2018, which is incorporated herein by reference in its entirety.

The apparatus 250 includes a unitary body 252 provided with a carry handle 254 attached to the unitary body 252, and is small enough to be transported by one user (i.e. one person) to the area to be cleaned. The unitary body 252 carries the various components of the functional systems of the apparatus 250, including a supply tank 256, fluid distributor 258, a suction nozzle 260 defining an inlet opening 262, a suction source, which may be a motor/fan assembly including at least a vacuum motor 264, a recovery tank 266, and exhaust vents 268. An agitator 270 can be adjacent to or couple to the suction nozzle 260.

The apparatus 250 can include a controller 272 operably coupled with the various functional systems of the apparatus for controlling its operation and at least one user interface through which a user of the apparatus interacts with the controller 272. The user interface shown includes one or more input controls on the carry handle 254, such as a power input control 274 which controls the supply of power to one or more electrical components of the apparatus 250 during normal operation and a drying cycle input control 276 which initiates a drying cycle. The controller 272 can be a microcontroller unit (MCU) that contains at least one central processing unit (CPU). The carry handle 254 can also include a charging port 278 for recharging a power supply on-board the apparatus 250, which can be a rechargeable battery or battery pack, such as a lithium ion battery or battery pack.

The controller 272 can further be configured to execute a drying cycle in which forced air flows through the recovery system to dry out components that remain wet and/or retain moisture post-operation. Such components can include the suction nozzle 260, the recovery tank 266, any filters upstream or downstream of the vacuum motor 264, and any of the various conduits, ducts, and/or hoses fluidly coupling components of the recovery system together. The user can select the input control 276 to initiate the drying cycle. The drying cycle can proceed according to any of the embodiments described above, and can include powering the vacuum motor 264 to produce the flow of forced air through the recovery system.

FIG. 15 is a perspective view of a surface cleaning apparatus according to another embodiment of the invention, comprising an autonomous surface cleaning apparatus or wet extraction robot 310 that mounts the components of various functional systems of the deep cleaner in an autonomously moveable unit or housing 312. The robot 310 can include various systems and components described for the embodiment of FIG. 1, including a recovery system for removing liquid and debris from the surface to be cleaned and a fluid delivery system for storing cleaning fluid and delivering the cleaning fluid to the surface to be cleaned. One example of a suitable wet extraction robot in which the various features and improvements described herein can be used is disclosed in U.S. Patent Application Publication No. 2018/0368646, published Dec. 27, 2018, which is incorporated herein by reference in its entirety.

The fluid system can include recovery pathway through the robot 310 having a dirty inlet and a clean air outlet, an extraction or suction nozzle 314 which is positioned to confront the surface to be cleaned and defines the air inlet, a recovery tank 316 for receiving dirt and liquid removed from the surface for later disposal, and a suction source which may be a motor/fan assembly including at least a vacuum motor 318. The recovery tank 316 can also define a portion of the extraction path and can comprise an air/liquid separator for separating liquid from the working airstream. Optionally, a pre-motor filter and/or a post-motor filter (not shown) can be provided as well.

At least one agitator or brushroll 320 can be provided for agitating the surface to be cleaned onto which fluid has been dispensed from the fluid delivery system. A drive assembly including a brush motor 322 can be provided within the housing 312 to drive the brushroll 320. Alternatively, the brushroll 320 can be driven by the vacuum motor 318. The brushroll 320 can be received in a brush chamber 324 on the housing 312, which can also define the suction nozzle 314. While not shown, an interference wiper and a squeegee can be provided on the housing 312.

The robot 310 further includes a drive system for autonomously moving the robot 310 over the surface to be cleaned, and can include drive wheels 326 operated by a common drive motor or individual drive motors. The robot 310 can be configured to move randomly about a surface while cleaning the floor surface, using input from various sensors to change direction or adjust its course as needed to avoid obstacles, or, as illustrated herein, can include a navigation/mapping system for guiding the movement of the robot 310 over the surface to be cleaned. In one embodiment, the robot 310 includes a navigation and path planning system that is operably coupled with the drive system. The system builds and stores a map of the environment in which the robot 310 is used, and plans paths to methodically clean the available area. An artificial barrier system (not shown) can optionally be provided with the robot 310 for containing the robot 310 within a user-determined boundary.

The robot 310 can optionally be provided with a docking station 328 for recharging the robot 310. The docking station 328 can be connected to a household power supply, such as a wall outlet, and can include a converter for converting the AC voltage into DC voltage for recharging a power supply on-board the robot 310, which can be a rechargeable battery 330, e.g. a lithium ion battery or battery pack. The docking station 328 can have charging contacts, and corresponding charging contacts can be provided on the exterior of the robot 310, such as on the exterior of the housing 312. The docking station 328 can optionally include various sensors and emitters for monitoring robot status, enabling auto-docking functionality, communicating with the robot 310, as well as features for network and/or Bluetooth connectivity.

The robot 310 can include a controller 332 operably coupled with the various functional systems of the apparatus for controlling its operation and at least one user interface through which a user of the apparatus interacts with the controller 332. The user interface shown includes one or more input controls on the unit or housing 312, such as a power input control 334 which controls the supply of power to one or more electrical components of the robot 310 during normal operation and a drying cycle input control 336 which initiates a drying cycle. The controller 332 can be a microcontroller unit (MCU) that contains at least one central processing unit (CPU).

The controller 332 can further be configured to execute a drying cycle in which forced air flows through the recovery system to dry out components that remain wet and/or retain moisture post-operation. Such components can include the suction nozzle 314, the recovery tank 316, any filters upstream or downstream of the vacuum motor 318, and any of the various conduits, ducts, and/or hoses fluidly coupling components of the recovery system together. The user can select the drying cycle input control 336 to initiate the drying cycle, or another user-engageable button or switch provided elsewhere on the apparatus 10, on the docking station 328, or on a smartphone running a downloaded application for the robot 310. The drying cycle can proceed according to any of the embodiments described above, and can include powering the vacuum motor 318 to produce the flow of forced air through the recovery system and/or the brush motor 322 for rotation of the brushroll 320. Optionally, a heat source or heater can operate to heat the forced air flow during the drying cycle. In at least some embodiments, the robot 310 can be docked with the docking station 328 for operation of the drying cycle, as previously described. During the drying cycle, the battery 330 can power the vacuum motor 318 and/or the brush motor 322. Alternatively, power for the drying cycle can be provided via the docking station 328.

To the extent not already described, the different features and structures of the various embodiments of the invention, may be used in combination with each other as desired, or may be used separately. That one surface cleaning apparatus is illustrated herein as having all of these features does not mean that all of these features must be used in combination, but rather done so here for brevity of description. Thus, the various features of the different embodiments may be mixed and matched in various vacuum cleaner configurations as desired to form new embodiments, whether or not the new embodiments are expressly described.

The above description relates to general and specific embodiments of the disclosure. However, various alterations and changes can be made without departing from the spirit and broader aspects of the disclosure as defined in the appended claims, which are to be interpreted in accordance with the principles of patent law including the doctrine of equivalents. As such, this disclosure is presented for illustrative purposes and should not be interpreted as an exhaustive description of all embodiments of the disclosure or to limit the scope of the claims to the specific elements illustrated or described in connection with these embodiments. Any reference to elements in the singular, for example, using the articles "a," "an," "the," or "said," is not to be construed as limiting the element to the singular.

Likewise, it is also to be understood that the appended claims are not limited to express and particular compounds, compositions, or methods described in the detailed description, which may vary between particular embodiments that fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

The invention claimed is:

1. A method for post-operation maintenance of a surface cleaning apparatus comprising a fluid recovery system having a recovery pathway, a suction nozzle, a motor/fan assembly in fluid communication with the suction nozzle for generating a working air stream flowing through the recovery pathway, the motor/fan assembly comprising a vacuum motor and a fan operably coupled with the vacuum motor, and a recovery tank, the recovery tank and the suction nozzle at least partially defining the recovery pathway, the method comprising:

initiating a drying cycle;

powering the vacuum motor at a reduced power level; and generating, with the fan, a forced air flow through the recovery pathway to dry components of the fluid recovery system;

wherein powering the vacuum motor at the reduced power level comprises powering the vacuum motor at lower power level during the drying cycle than during normal operation of the surface cleaning apparatus.

2. The method of claim 1, wherein powering the vacuum motor at the reduced power level comprises generating a reduced air flow through the recovery pathway during the drying cycle than during normal operation of the surface cleaning apparatus.

3. The method of claim 2, wherein powering the vacuum motor at the reduced power level comprises powering the vacuum motor at lower motor speed during the drying cycle than during normal operation of the surface cleaning apparatus.

4. The method of claim 3, wherein the ratio of motor speed during the drying cycle to motor speed during normal operation is 30:1.

5. The method of claim 2, wherein powering the vacuum motor at the reduced power level comprises generating a reduced sound level during the drying cycle than during normal operation of the surface cleaning apparatus.

6. The method of claim 1, wherein powering the vacuum motor at the reduced power level comprises powering the vacuum motor at lower motor speed during the drying cycle than during normal operation of the surface cleaning apparatus.

7. The method of claim 6, wherein the ratio of motor speed during the drying cycle to motor speed during normal operation is 30:1.

8. The method of claim 1, wherein powering the vacuum motor at the reduced power level comprises generating a reduced sound level during the drying cycle than during normal operation of the surface cleaning apparatus.

9. The method of claim 1, wherein generating the forced air flow comprises drawing air in through an intake, pushing air backwards through the recovery pathway, and exhausting air through the suction nozzle.

10. The method of claim 1, comprising powering a heater in fluid communication with the recovery pathway, wherein generating the forced air flow comprises generating a heated forced air flow through the recovery pathway.

11. A method for post-operation maintenance of a surface cleaning apparatus comprising a fluid recovery system having a recovery pathway, a suction nozzle, a motor/fan assembly in fluid communication with the suction nozzle for generating a working air stream flowing through the recovery pathway, the motor/fan assembly comprising a vacuum motor and a fan operably coupled with the vacuum motor, and a recovery tank, the recovery tank and the suction nozzle at least partially defining the recovery pathway, the method comprising:

initiating a self-cleaning cycle;

during the self-cleaning cycle, powering a pump to deliver cleaning fluid to a brushroll, powering a brushroll motor to rotate the brushroll, and powering the vacuum motor at a first power level;

initiating a drying cycle;

during the drying cycle, powering vacuum motor at a second power level; and during the drying cycle, generating, with the fan, a forced air flow through the recovery pathway to dry components of the fluid recovery system;

wherein the second power level is a reduced power level that is less than the first power level.

12. The method of claim 11, wherein powering the vacuum motor at the reduced power level comprises generating a reduced air flow through the recovery pathway during the drying cycle than during normal operation of the surface cleaning apparatus.

13. The method of claim 12, wherein powering the vacuum motor at the reduced power level comprises powering the vacuum motor at lower motor speed during the drying cycle than during normal operation of the surface cleaning apparatus.

14. The method of claim 13, wherein the ratio of motor speed during the drying cycle to motor speed during normal operation is 30:1.

15. The method of claim 12, wherein powering the vacuum motor at the reduced power level comprises generating a reduced sound level during the drying cycle than during normal operation of the surface cleaning apparatus.

16. The method of claim 11, wherein powering the vacuum motor at the reduced power level comprises powering the vacuum motor at lower motor speed during the drying cycle than during normal operation of the surface cleaning apparatus.

17. The method of claim 16, wherein the ratio of motor speed during the drying cycle to motor speed during normal operation is 30:1.

18. The method of claim 11, wherein powering the vacuum motor at the reduced power level comprises generating a reduced sound level during the drying cycle than during normal operation of the surface cleaning apparatus.

19. The method of claim 11, wherein generating the forced air flow comprises drawing air in through an intake, pushing air backwards through the recovery pathway, and exhausting air through the suction nozzle.

20. The method of claim 11, comprising powering a heater in fluid communication with the recovery pathway, wherein generating the forced air flow comprises generating a heated forced air flow through the recovery pathway.

* * * * *